(12) United States Patent
Tsuchiya et al.

(10) Patent No.: US 11,987,146 B2
(45) Date of Patent: May 21, 2024

(54) POWER MANAGEMENT SYSTEM AND SERVER OPERABLE FOR SELECTING AND SCHEDULING POWER STORAGES BASED ON USERS DESIRES

(71) Applicant: Toyota Jidosha Kabushiki Kaisha, Toyota (JP)

(72) Inventors: Yoshiyuki Tsuchiya, Hamamatsu (JP); Toru Nakamura, Toyota (JP); Shigeki Kinomura, Toyota (JP); Hidetoshi Kusumi, Nagoya (JP); Hironobu Kitaoka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/110,975

(22) Filed: Dec. 3, 2020

(65) Prior Publication Data

US 2021/0170903 A1 Jun. 10, 2021

(30) Foreign Application Priority Data

Dec. 9, 2019 (JP) ................................ 2019-222036

(51) Int. Cl.
*B60L 53/68* (2019.01)
*B60L 53/60* (2019.01)
(Continued)

(52) U.S. Cl.
CPC ............... *B60L 53/68* (2019.02); *B60L 53/60* (2019.02); *B60L 53/62* (2019.02); *B60L 53/66* (2019.02);
(Continued)

(58) Field of Classification Search
CPC .......... B60L 53/68; B60L 53/60; B60L 53/62; B60L 53/66; B60L 58/12; B60L 58/16; H02J 3/322; H02J 7/00034
(Continued)

(56) References Cited

U.S. PATENT DOCUMENTS 10,110,029 B2 * 10/2018 Toya ................... H02J 7/00047
10,819,135 B2 * 10/2020 Ambroziak ............. B60L 55/00
(Continued)

FOREIGN PATENT DOCUMENTS

JP 2010-098793 A 4/2010
JP 2012-048286 A 3/2012
(Continued)

OTHER PUBLICATIONS

Office Action dated Jun. 7, 2022 issued in U.S. Appl. No. 17/115,009, filed Dec. 8, 2020.
(Continued)

*Primary Examiner* — Richard Isla
*Assistant Examiner* — Manuel Hernandez
(74) *Attorney, Agent, or Firm* — Dinsmore & Shohl LLP

(57) ABSTRACT

A power management system includes a plurality of power storages and a server. The server includes a selector that selects at least one of the plurality of power storages, a scheduler that makes a schedule for the selected power storage, and a request processor that requests a user of the selected power storage to control at least one of external charging and external power feed in accordance with the made schedule. The server obtains desire information that indicates a desire level (priority on battery life/priority on an incentive) and carries out at least one of selection of the power storage and making of the schedule based on the obtained desire information.

7 Claims, 12 Drawing Sheets

(51) Int. Cl.
  *B60L 53/62* (2019.01)
  *B60L 53/66* (2019.01)
  *B60L 58/12* (2019.01)
  *B60L 58/16* (2019.01)
  *H02J 3/32* (2006.01)
  *H02J 7/00* (2006.01)

(52) U.S. Cl.
  CPC ............... *B60L 58/12* (2019.02); *B60L 58/16* (2019.02); *H02J 3/322* (2020.01); *H02J 7/00034* (2020.01)

(58) Field of Classification Search
  USPC ........................................................ 320/109
  See application file for complete search history.

(56) References Cited

U.S. PATENT DOCUMENTS

| | | | |
|---|---|---|---|
| 2009/0091291 A1 | 4/2009 | Woody et al. | |
| 2010/0188043 A1* | 7/2010 | Kelty | B60L 58/16 320/109 |
| 2013/0285608 A1 | 10/2013 | Jikihara | |
| 2013/0328527 A1* | 12/2013 | Kang | B60L 53/00 320/109 |
| 2014/0117933 A1* | 5/2014 | Nyu | H02J 7/04 320/109 |
| 2015/0046222 A1* | 2/2015 | Ishii | G06Q 50/06 705/7.31 |
| 2015/0306968 A1 | 10/2015 | Ohira et al. | |
| 2016/0047862 A1* | 2/2016 | Shimizu | G07F 15/005 702/63 |
| 2016/0075247 A1 | 3/2016 | Uyeki | |
| 2018/0241229 A1 | 8/2018 | Kitaoka et al. | |
| 2018/0262016 A1 | 9/2018 | Baughman et al. | |
| 2019/0092176 A1* | 3/2019 | Uyeki | B60L 53/665 |
| 2020/0156495 A1* | 5/2020 | Lindup | B60L 55/00 |
| 2020/0395771 A1 | 12/2020 | Hiratsuka | |
| 2021/0094437 A1 | 4/2021 | Tsubokura et al. | |
| 2021/0170902 A1 | 6/2021 | Tsuchiya | |
| 2022/0048399 A1 | 2/2022 | Nishita et al. | |
| 2022/0305948 A1* | 9/2022 | Munemoto | B60L 53/68 |

FOREIGN PATENT DOCUMENTS

| | | |
|---|---|---|
| JP | 2012-139025 A | 7/2012 |
| JP | 2012249505 A | 12/2012 |
| JP | 2014-087236 A | 5/2014 |
| JP | 2014158375 A | 8/2014 |
| JP | 2015100203 A | 5/2015 |
| JP | 2015-216836 A | 12/2015 |
| JP | 2018-064413 A | 4/2018 |
| JP | 2018-137886 A | 8/2018 |
| WO | 2012/093638 A1 | 7/2012 |
| WO | 2016/169515 A1 | 10/2016 |

OTHER PUBLICATIONS

Final Office Action dated Oct. 25, 2022 to U.S. Appl. No. 17/115,009, filed Dec. 8, 2020.

Notice of Allowance dated Jan. 25, 2023 in related U.S. Appl. No. 17/115,009.

Notice of Allowance dated Mar. 1, 2023 in related U.S. Appl. No. 17/115,009.

* cited by examiner

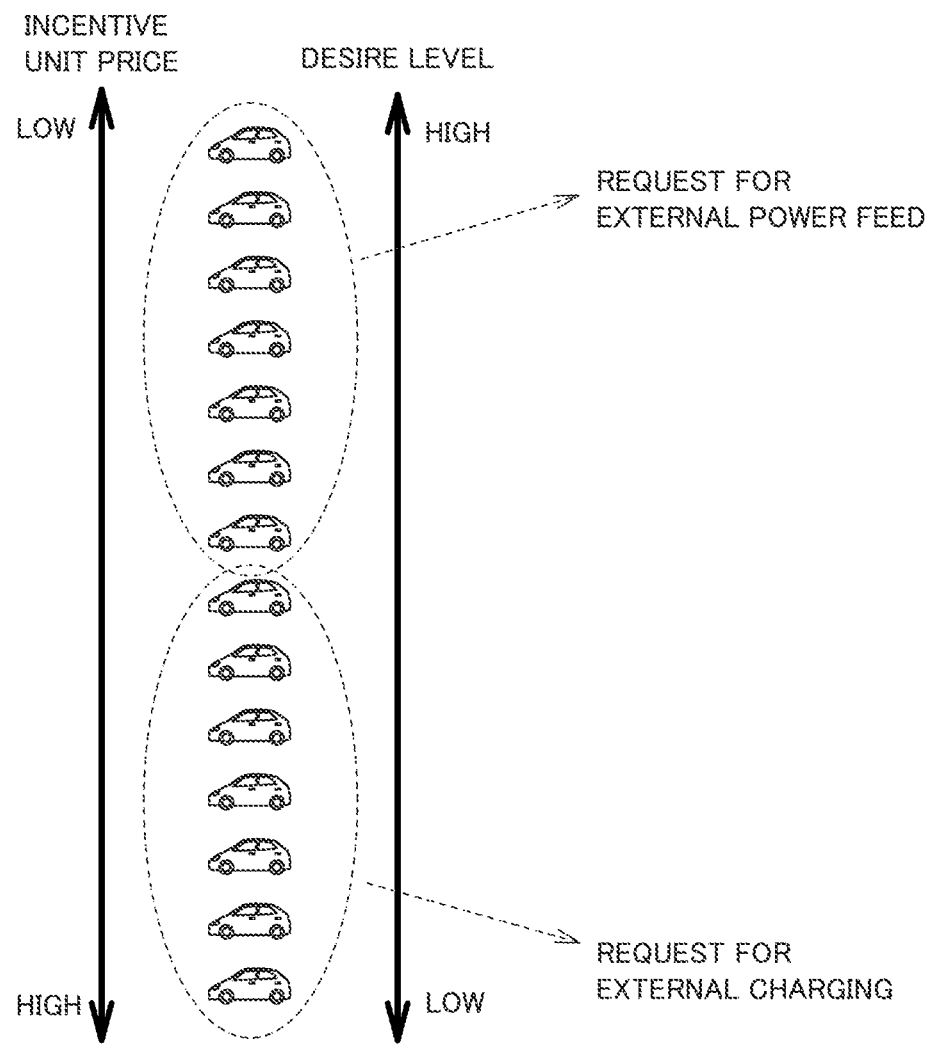

POWER MANAGEMENT SYSTEM AND SERVER OPERABLE FOR SELECTING AND SCHEDULING POWER STORAGES BASED ON USERS DESIRES

CROSS REFERENCE TO RELATED APPLICATIONS

This nonprovisional application claims priority to Japanese Patent Application No. 2019-222036 filed with the Japan Patent Office on Dec. 9, 2019, the entire contents of which are hereby incorporated by reference.

BACKGROUND

Field

The present disclosure relates to a power management system and a server, and more specifically to a technique for regulation of supply and demand of electric power by using a power storage.

Description of the Background Art

A technique for regulation of supply and demand of electric power by using a mobile body such as an electric vehicle has been known. For example, Japanese Patent Laying-Open No. 2012-048286 discloses a power management system including a plurality of electric vehicles each including a power storage and a charge monitoring control center. The charge monitoring control center invites an electric vehicle of which power storage is to be charged, determines a charging location and an amount of charging of each electric vehicle that has accepted the invitation, and instructs each electric vehicle to move to the charging location.

SUMMARY

In the power management system described in Japanese Patent Laying-Open No. 2012-048286, a user of an electric vehicle can be given an incentive by carrying out charging in response to a request from the charge monitoring control center. All users, however, do not place highest priority on the incentive. Some users desire suppression of deterioration of the power storage rather than reception of the incentive for meeting the request from the charge monitoring control center. The power management system described in Japanese Patent Laying-Open No. 2012-048286 does not pay attention to such users and there is a room for improvement.

The present disclosure was made to solve the problem above, and an object thereof is to provide a power management system and a server that can request a user of a power storage to regulate supply and demand of electric power with attention being paid to a user who desires suppression of deterioration of the power storage.

A power management system according to the present disclosure includes a plurality of power storages and a server. Each of the plurality of power storages carries out at least one of external charging and external power feed. External charging is charging of the power storage with electric power supplied from the outside. External power feed is supply of electric power from the power storage to the outside. The server includes a selector, a scheduler, and a request processor. The selector selects at least one of the plurality of power storages. The scheduler makes a schedule for the selected power storage. The request processor requests a user of the selected power storage to control at least one of external charging and external power feed in accordance with the made schedule. The server obtains for each power storage, desire information that indicates at least one of a first desire level and a second desire level, the first desire level indicating a level of the user's desire for suppression of deterioration of the power storage, the second desire level indicating a level of the user's desire for acquisition of an incentive for meeting the request, and carries out at least one of selection of the power storage and making of the schedule based on the obtained desire information.

A server according to the present disclosure is included in a power management system including a plurality of power storages. Each of the plurality of power storages carries out at least one of external charging and external power feed. External charging is charging of the power storage with electric power supplied from the outside. External power feed is supply of electric power from the power storage to the outside. The server includes a selector, a scheduler, and a request processor. The selector selects at least one of the plurality of power storages. The scheduler makes a schedule for the selected power storage. The request processor requests a user of the selected power storage to control at least one of external charging and external power feed in accordance with the made schedule. The server obtains for each power storage, desire information that indicates at least one of a first desire level and a second desire level, the first desire level indicating a level of user's desire for suppression of deterioration of the power storage, the second desire level indicating a level of user's desire for acquisition of an incentive for meeting the request, and carries out at least one of selection of the power storage and making of the schedule based on the obtained desire information.

The request processor of the server can request the user of the power storage to regulate supply and demand of electric power. The request processor may transmit a signal to a communication apparatus registered in the server in association with the user of the power storage. The user of each of the plurality of power storages can contribute to regulation of supply and demand of electric power by controlling at least one of external charging and external power feed by the power storage in accordance with the request from the request processor (or by permitting remote control of the power storage by the server during a period indicated in the schedule). A user who prefers suppression of deterioration of the power storage to acquisition of the incentive in the desire information is also referred to as a "first user" below. A user who prefers acquisition of the incentive to suppression of deterioration of the power storage in the desire information is also referred to as a "second user."

The server carries out at least one of selection of the power storage and making of the schedule based on the desire information. For example, for a request which may cause deterioration of the power storage, in selection of a power storage, the server may make the power storage of the first user less likely to be selected. In making a schedule for the power storage of the first user, the server may make a schedule in which the power storage is less likely to deteriorate. The server can thus adjust susceptibility of each power storage to deterioration based on at least one of selection of the power storage and making of the schedule. Therefore, according to the server, when a request for regulation of supply and demand of electric power is issued to a user of the power storage, the request can be issued with attention being paid to the user who desires suppression of deterioration of the power storage.

The desire information may be at least one of information that indicates the level of the user's desire for suppression of deterioration of the power storage by any of desiring and not desiring suppression of deterioration of the power storage and information that indicates the level of the user's desire for acquisition of the incentive by any of desiring and not desiring acquisition of the incentive.

According to the configuration, users of the power storages can be categorized into the first user (that is, the user who prefers suppression of deterioration of the power storage to acquisition of the incentive) and the second user (that is, the user who prefers acquisition of the incentive to suppression of deterioration of the power storage). The server can issue a request suitable for each user by carrying out at least one of selection of the power storage and making of the schedule in manners different between the first user and the second user.

Though description is given above assuming that the desire information indicates each of the first desire level and the second desire level in two levels (desiring and not desiring) with the users of the power storages being categorized into the first user and the second user, the desire information is not limited to information that indicates each of the first desire level and the second desire level in two levels. The desire information may be information that indicates each desire level in three or more levels or information that indicates each desire level in continuous values from 0 to 100.

When the selector selects a power storage of which a user is requested to carry out external charging by the request processor, the selector may preferentially sequentially select the power storage lower in first desire level or the power storage higher in second desire level.

Deterioration of the power storage tends to proceed more as a frequency of charging is higher. According to the configuration, when the selector selects the power storage of which the user is requested to carry out external charging, the power storage of the user lower in first desire level or higher in second desire level is preferentially sequentially selected. As the power storage of the user lower in first desire level is preferentially sequentially selected, increase in frequency of charging of the power storage of the user higher in first desire level can be suppressed. As increase in frequency of charging of the power storage is suppressed, deterioration of the power storage is suppressed. As the power storage of the user higher in second desire level is preferentially sequentially selected, the user higher in second desire level is more likely to acquire the incentive.

When the selector selects a power storage of which a user is requested to carry out external power feed by the request processor, the selector may preferentially sequentially select the power storage higher in first desire level or the power storage higher in second desire level.

The power storage tends to deteriorate as it is left stand in a high SOC state. The state of charge (SOC) represents a remaining amount of stored power, and it is expressed, for example, as a ratio of a current amount of stored power to an amount of stored power in a fully charged state that ranges from 0 to 100%. According to the configuration, when the selector selects a power storage of which the user is requested to carry out external power feed, the power storage of the user higher in first desire level or higher in second desire level is preferentially sequentially selected. As the power storage of the user higher in first desire level is preferentially sequentially selected, the SOC of the power storage of the user higher in first desire level can be lowered. By lowering the SOC of the power storage, deterioration of the power storage is suppressed. As the power storage of the user higher in second desire level is preferentially sequentially selected, the user higher in second desire level is more likely to acquire the incentive.

When the selector selects a power storage of which a user is requested to carry out external power feed by the request processor, the selector may preferentially sequentially select the power storage higher in first desire level or the power storage lower in second desire level from among power storages that satisfy a prescribed condition.

According to the configuration, when the selector selects a power storage of which a user is requested to carry out external power feed, only the power storage that satisfies the prescribed condition is selected. The prescribed condition may be satisfied when the SOC of the power storage is equal to or larger than a prescribed value or when a temperature of the power storage is equal to or larger than a prescribed value. When the selector selects a power storage of which a user is requested to carry out external power feed, the power storage of the user higher in first desire level or lower in second desire level is preferentially sequentially selected. Therefore, the power storage of the user higher in first desire level or lower in second desire level being left stand in a state susceptible to deterioration (for example, in a high SOC state) can be suppressed. When a temperature of the power storage is high, an abnormal condition may be occurring in the power storage. By lowering the SOC of the power storage at a high temperature, safety can be enhanced.

According to the configuration, when the selector selects a power storage of which a user is requested to carry out external power feed, the power storage of the user higher in first desire level (or lower in second desire level) is more likely to be selected. Deterioration of the power storage of the user higher in first desire level (or lower in second desire level) can thus be suppressed. By preferentially selecting the power storage of the user higher in first desire level (or lower in second desire level) in selection of the power storage, however, an opportunity for the user lower in first desire level (or higher in second desire level) to acquire the incentive may be lost. In view of such a problem, a configuration below may be adopted.

The server may manage for each user, a unit price of the incentive to be given to the user that meets the request from the request processor, and increase the unit price of the incentive for the user lower in first desire level or the user higher in second desire level.

According to the configuration, the unit price of the incentive is increased for a user lower in first desire level or higher in second desire level. By lowering the first desire level (or raising the second desire level), the user of the power storage is more likely to obtain a high incentive at the sacrifice of susceptibility of the power storage to deterioration. Fairness among users can thus be ensured.

The plurality of power storages may be mounted on a plurality of mobile bodies, respectively. The server may obtain next departure time for each mobile body. Each of the plurality of mobile bodies may move with electric power stored in the power storage. When the scheduler makes a charging schedule for a selected mobile body, the scheduler may make the charging schedule to make a time lag between charging end time and the next departure time smaller in a mobile body of the user higher in first desire level or the user lower in second desire level.

It is expected that, when the mobile body carries out external charging, the SOC of the power storage becomes higher and the power storage will be in the high SOC state at the charging end time. It is expected that, as the mobile body departs (that is, moves), electric power in the power storage is consumed and the SOC of the power storage is lowered. Therefore, as a time lag between the charging end time and the next departure time is smaller, a time period for which the power storage is left stand in the high SOC state is expected to be shorter. According to the configuration, the charging schedule is made such that the mobile body of the user higher in first desire level or lower in second desire level is smaller in time lag between the charging end time and the next departure time. The power storage of the user higher in first desire level or lower in second desire level being left stand in the high SOC state (and deterioration of the power storage) can thus be suppressed.

The server may predict the next departure time for each mobile body based on history data (for example, a time period of stay from arrival at a charging location until departure) of each mobile body. The server may obtain the next departure time (that is, a user's schedule) from the user of the mobile body. The user can transmit the next departure time to the server through any communication equipment (for example, a portable terminal).

The selector may set an upper limit value of the number of times of charging per unit period for each power storage based on the desire information, and exclude a power storage of which the number of times of charging per unit period has exceeded the upper limit value from candidates for selection.

Deterioration of the power storage tends to proceed more as the number of times of charging per unit period is larger. The server can exclude the power storage of which the number of times of charging per unit period has exceeded the upper limit value from candidates for selection. Progress of deterioration of the power storage by external charging or external power feed in response to the request from the request processor can thus be suppressed. Since the server sets the upper limit value of the number of times of charging per unit period based on the desire information, deterioration of the power storage of the user higher in first desire level or lower in second desire level can be suppressed.

A process from start of charging until stop of charging is counted as one charging. Transition of the power storage from a non-charging state (that is, a state in which charging is not being carried out) to a charging state (that is, a state in which charging is being carried out) is defined as start of charging. Transition of the power storage from the charging state to the non-charging state is defined as stop of charging. Transition of the power storage from the charging state to a discharging state (that is, a state in which discharging is being carried out) is also encompassed in stop of charging.

Setting of the upper limit value includes not only setting of an effective numeric value as the upper limit value but also setting of "no upper limit value." The selector may substantially set "no upper limit value" by setting a "MAX value (or infinity)" as the upper limit value.

Any power management system described above may further include a plurality of portable terminals carried by respective users of the plurality of power storages. Each of the plurality of portable terminals may accept input from the user of the power storage, and when the desire information is input by the user of the power storage, each of the plurality of portable terminals may transmit the input desire information to the server.

According to the configuration, the user can transmit the desire information to the server through the portable terminal.

In any power management system described above, the plurality of power storages may be mounted on a plurality of mobile bodies, respectively. Any power management system described above may further include a plurality of user terminals mounted on the plurality of mobile bodies, respectively. Each of the plurality of user terminals may accept input from the user of the power storage, and when the user of the power storage inputs the desire information, each of the plurality of user terminals may transmit the input desire information to the server.

According to the configuration, the user can transmit the desire information to the server through the user terminal of the mobile body.

An input from the user may be an input to a graphical user interface (GUI) or an audio input. The user may provide the input by operating a member such as a button or a lever. A signal from the portable terminal or the user terminal to the server may directly be transmitted from the portable terminal or the user terminal to the server, or from the portable terminal or the user terminal to the server via another apparatus.

In any power management system described above, the plurality of power storages may be mounted on a plurality of vehicles, respectively. Any power management system described above may further include a plurality of power facilities electrically connectable to the plurality of vehicles and a power grid that supplies electric power to each of the plurality of power facilities. The request processor may transmit a signal that requests a user of the vehicle to control at least one of external charging and external power feed in accordance with the schedule, to at least one of communication equipment mounted on the vehicle and a portable terminal carried by the user of the vehicle.

According to the configuration, as the server transmits the signal to the vehicle (more specifically, communication equipment) and/or the portable terminal, balance of supply and demand of the power grid can be regulated.

The signal from the server to the vehicle or the portable terminal may directly be transmitted from the server to the vehicle or the portable terminal or from the server to the vehicle or the portable terminal via another apparatus (for example, the power facility).

The mobile body may be an electrically powered vehicle. The electrically powered vehicle refers to a vehicle that travels with electric power stored in a power storage mounted on the vehicle. The mobile body may remotely be controllable or may be self-driving. The mobile body may be a flying object (for example, a drone).

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 14 is a diagram for illustrating a modification of selection of a DR vehicle shown in FIG. 10.

DETAILED DESCRIPTION

Figure 1:
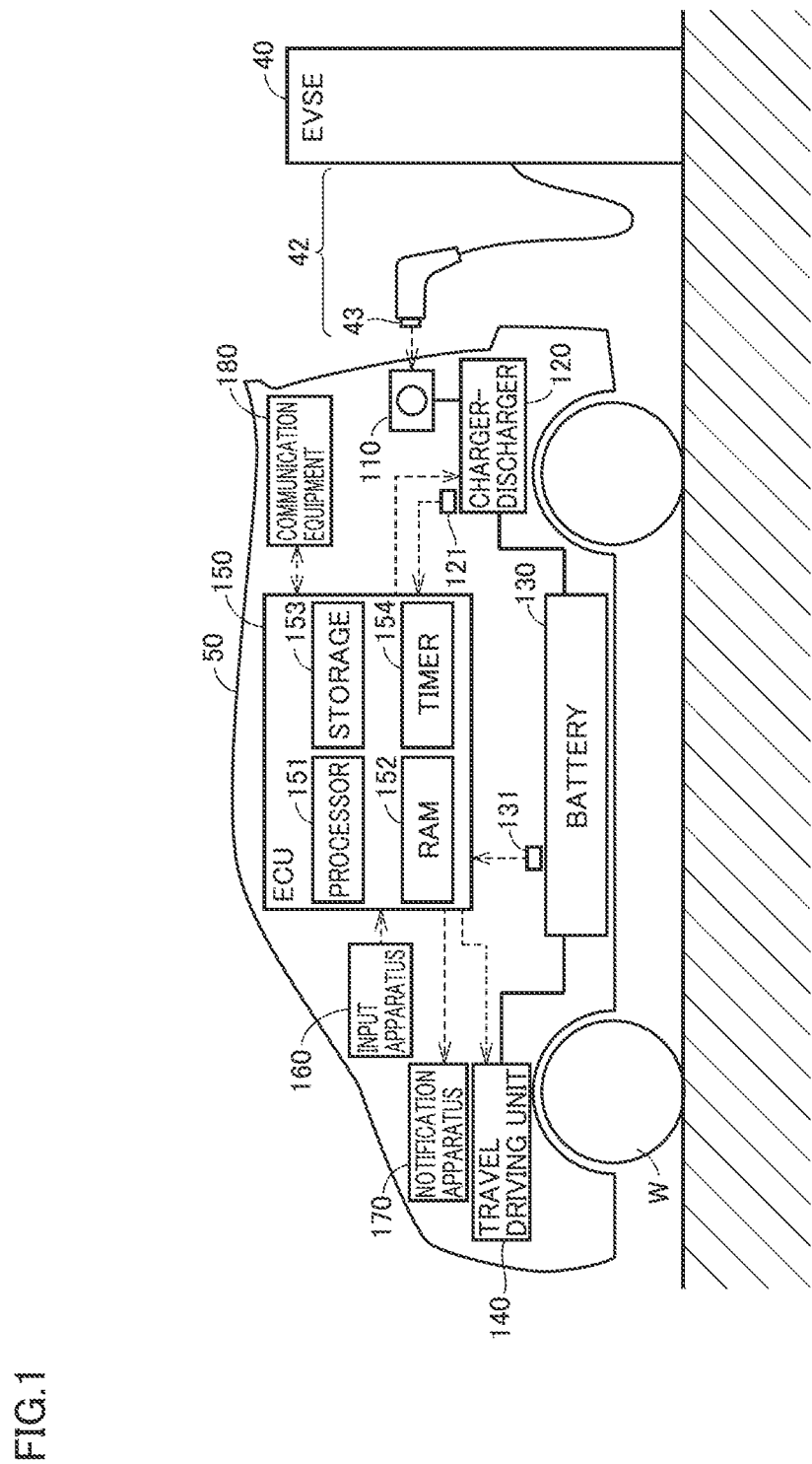
FIG. 1 is a diagram showing a configuration of a vehicle included in a power management system according to an embodiment of the present disclosure.

An embodiment of the present disclosure will be described below in detail with reference to the drawings. The same or corresponding elements in the drawings have the same reference characters allotted and description thereof will not be repeated.

A power management system according to this embodiment includes a plurality of vehicles. Though the plurality of vehicles in the power management system may be different from one another in configuration, they are identical in configuration in this embodiment. Each of a plurality of vehicles included in the power management system is denoted as a "vehicle 50" below and each of a plurality of pieces of EVSE included in the power management system is denoted as "EVSE 40" below, unless they are described as being distinguished from one another. EVSE means electric vehicle supply equipment.

FIG. 1 is a diagram showing a configuration of vehicle 50 included in the power management system according to this embodiment. Referring to FIG. 1, vehicle 50 includes a battery 130 that stores electric power for traveling. Battery 130 includes a secondary battery such as a lithium ion battery or a nickel metal hydride battery. In this embodiment, a battery assembly including a plurality of lithium ion batteries is adopted as the secondary battery. The battery assembly is composed of a plurality of cells electrically connected to one another. Instead of the secondary battery, another power storage such as an electric double layer capacitor may be adopted. Battery 130 according to this embodiment corresponds to an exemplary "power storage" according to the present disclosure.

Vehicle 50 includes an electronic control unit (which is referred to as an "ECU" below) 150. ECU 150 carries out charging control and discharging control of battery 130. ECU 150 controls communication with the outside of vehicle 50. Vehicle 50 further includes a monitoring module 131 that monitors a state of battery 130. Monitoring module 131 includes various sensors that detect a state (for example, a voltage, a current, and a temperature) of battery 130 and outputs a result of detection to ECU 150. ECU 150 can obtain a state (for example, a temperature, a current, a voltage, an SOC, and an internal resistance) of battery 130 based on an output (that is, detection values from various sensors) from monitoring module 131. Vehicle 50 may be an electric vehicle (EV) that can travel only with electric power stored in battery 130 or a plug-in hybrid vehicle (PHV) that can travel with both of electric power stored in battery 130 and output from an engine (not shown). Though vehicle 50 is driven by a user in this embodiment, vehicle 50 may be self-driving.

Vehicle 50 includes an inlet 110 and a charger-discharger 120 adapted to a power feed type of EVSE 40. Inlet 110 receives electric power supplied from the outside of vehicle 50. Inlet 110 outputs electric power supplied from charger-discharger 120 to the outside of vehicle 50. Though FIG. 1 shows only inlet 110 and charger-discharger 120, vehicle 50 may include an inlet and a charger-discharger for each power feed type so as to adapt to a plurality of power feed types (for example, an alternating-current (AC) type and a direct-current (DC) type).

A charging cable 42 is connected to EVSE 40. Charging cable 42 may always be connected to EVSE 40 or may be attachable to and removable from EVSE 40. Charging cable 42 includes a connector 43 at its tip end and contains a power line. Connector 43 of charging cable 42 can be connected to inlet 110. As connector 43 of charging cable 42 connected to EVSE 40 is connected to inlet 110 of vehicle 50, EVSE 40 and vehicle 50 are electrically connected to each other. Electric power can thus be supplied from EVSE 40 through charging cable 42 to vehicle 50.

Charger-discharger 120 is located between inlet 110 and battery 130. Charger-discharger 120 includes a relay that switches between connection and disconnection of an electric power path from inlet 110 to battery 130 and a power conversion circuit (neither of which is shown). For example, a bidirectional converter can be adopted as the power conversion circuit. Each of the relay and the power conversion circuit included in charger-discharger 120 is controlled by ECU 150. Vehicle 50 further includes a monitoring module 121 that monitors a state of charger-discharger 120. Monitoring module 121 includes various sensors that detect a state (for example, a voltage, a current, and a temperature) of charger-discharger 120 and outputs a result of detection to ECU 150. In this embodiment, monitoring module 121 detects a voltage and a current input to and output from the power conversion circuit.

As EVSE 40 outside vehicle 50 and inlet 110 are connected to each other through charging cable 42, electric power can be supplied and received between EVSE 40 and vehicle 50. Therefore, external charging by vehicle 50 can be carried out (that is, electric power can be supplied from the outside of vehicle 50 to charge battery 130 of vehicle 50). Electric power for external charging is supplied, for example, from EVSE 40 through charging cable 42 to inlet 110. Charger-discharger 120 converts electric power received at inlet 110 into electric power suitable for charging of battery 130 and outputs resultant electric power to battery 130. As EVSE 40 and inlet 110 are connected to each other through charging cable 42, external power feed by vehicle 50 (that is, power feed from vehicle 50 through charging cable 42 to EVSE 40) can be carried out. Electric power for external power feed is supplied from battery 130 to charger-discharger 120. Charger-discharger 120 converts electric power supplied from battery 130 into electric power suitable for external power feed and outputs resultant electric power to inlet 110. When any of external charging and external power feed is performed, the relay of charger-discharger 120 is closed (connected), and when neither of external charging and external power feed is performed, the relay of charger-discharger 120 is opened (disconnected).

The configuration of charger-discharger 120 is not limited as above and can be modified as appropriate. Charger-discharger 120 may include, for example, at least one of a rectification circuit, a power factor correction (PFC) circuit, an insulating circuit (for example, an insulating transformer), an inverter, and a filter circuit. When vehicle 50 carries out external power feed to AC type EVSE, charger-discharger 120 may subject electric power discharged from battery 130 to DC/AC conversion and resultant AC power may be supplied from vehicle 50 to the EVSE. When vehicle 50 carries out external power feed to DC type EVSE, vehicle 50 may supply DC power to the EVSE and an inverter contained in the EVSE may carry out DC/AC conversion. Standards of the DC type EVSE may be any of CHAdeMO, Combined Charging System (CCS), GB/T, and Tesla.

ECU 150 includes a processor 151, a random access memory (RAM) 152, a storage 153, and a timer 154. For example, a central processing unit (CPU) can be adopted as processor 151. RAM 152 functions as a work memory that temporarily stores data to be processed by processor 151. Storage 153 can store information that is put thereinto. Storage 153 includes, for example, a read only memory (ROM) and a rewritable non-volatile memory. Storage 153 stores not only a program but also information (for example, a map, a mathematical expression, and various parameters) to be used by a program. As a program stored in storage 153 is executed by processor 151, various types of control by ECU 150 are carried out in this embodiment. Various types of control by ECU 150 are not limited to control carried out by software but can also be carried out by dedicated hardware (electronic circuitry). Any number of processors may be provided in ECU 150 and a processor may be prepared for each prescribed type of control.

Timer 154 notifies processor 151 that the set time has come. As the time set in timer 154 comes, timer 154 transmits a signal to that effect to processor 151. In this embodiment, a timer circuit is adopted as timer 154. Timer 154 may be implemented by software instead of hardware (timer circuitry). ECU 150 can obtain current time from a real time clock (RTC) circuit (not shown) contained in ECU 150.

Vehicle 50 further includes a travel driving unit 140, an input apparatus 160, a notification apparatus 170, communication equipment 180, and a drive wheel W. Vehicle 50 is not limited to a front-wheel-drive vehicle shown in FIG. 1 and it may be a rear-wheel-drive vehicle or a four-wheel-drive vehicle.

Travel driving unit 140 includes a not-shown power control unit (PCU) and a motor generator (MG), and allows vehicle 50 to travel with electric power stored in battery 130. The PCU includes, for example, a controller including a processor, an inverter, a converter, and a relay (none of which is shown). The relay included in the PCU is referred to as a "system main relay (SMR)" below. The controller of the PCU receives an instruction (a control signal) from ECU 150 and controls the inverter, the converter, and the SMR of the PCU in accordance with the instruction. The MG is implemented, for example, by a three-phase AC motor generator. The MG is driven by the PCU and rotates drive wheel W. The MG performs regeneration and supplies regenerated electric power to battery 130. The SMR switches between connection and disconnection of an electric power path from battery 130 to the PCU. The SMR is closed (connected) when vehicle 50 travels.

Input apparatus 160 accepts an input from a user. Input apparatus 160 is operated by a user and outputs a signal corresponding to the operation by the user to ECU 150. Communication may be wired or wireless. Examples of input apparatus 160 include various switches, various pointing devices, a keyboard, and a touch panel. An operation portion of a car navigation system may be adopted as input apparatus 160. A smart speaker that accepts audio input may be adopted as input apparatus 160.

Notification apparatus 170 performs prescribed processing for giving a notification to a user (for example, a driver and/or a passenger of vehicle 50) when a request is given from ECU 150. Notification apparatus 170 may include at least one of a display apparatus (for example, a touch panel display), a speaker (for example, a smart speaker), and a lamp (for example, a malfunction indicator lamp (MIL)). Notification apparatus 170 may be implemented by a meter panel, a head-up display, or a car navigation system.

Communication equipment 180 includes various communication interfaces (I/F). Communication equipment 180 may include a data communication module (DCM). ECU 150 wirelessly communicates with a communication apparatus outside vehicle 50 through communication equipment 180.

Though not shown, vehicle 50 includes various sensors (for example, a position sensor, an outside air temperature sensor, a vehicle speed sensor, and an odometer) that detect a state of vehicle 50 in real time. The state of vehicle 50 is successively detected and recorded in storage 153 of ECU 150. The position sensor may be a sensor based on the global positioning system (GPS). The position sensor may be contained in a car navigation system (not shown) mounted on vehicle 50.

An electric power system dependent on a large-scale power plant (an intensive energy resource) possessed by an electric power utility company has recently been reviewed and a scheme for utilizing an energy resource possessed by each demand side (which is also referred to as "demand side resources (DSR)" below) in the electric power system has been constructed. The DSR functions as distributed energy resources (which are also referred to as "DER" below).

A virtual power plant (VPP) has been proposed as a scheme for utilizing the DSR for an electric power system. The VPP refers to a scheme in which a large number of DER (for example, DSR) are put together according to a sophisticated energy management technology that makes use of the Internet of Things (IoT) and the DER are remotely controlled as being integrated as if the DER functioned as a single power plant. In the VPP, an electric utility that puts the DER together to provide an energy management service is referred to as an "aggregator." An electric power utility company, for example, in coordination with an aggregator, can balance between supply and demand of electric power based on demand response (which is also referred to as "DR" below).

DR is an approach to balancing between supply and demand of electric power by issuing a prescribed request to each demand side by using a demand response signal (which is also referred to as a "DR signal" below). The DR signal is broadly categorized into two types of a DR signal that requests suppression of power demand or backfeeding (which is also referred to as a "DR suppression signal" below) and a DR signal that requests increase in power demand (which is also referred to as a "DR increase signal" below).

A vehicle grid integration (VGI) system is adopted as the power management system according to this embodiment. In the VGI system, an electrically powered vehicle (that is, vehicle 50 described above) including a power storage is adopted as DSR for realizing VPP.

Figure 2:
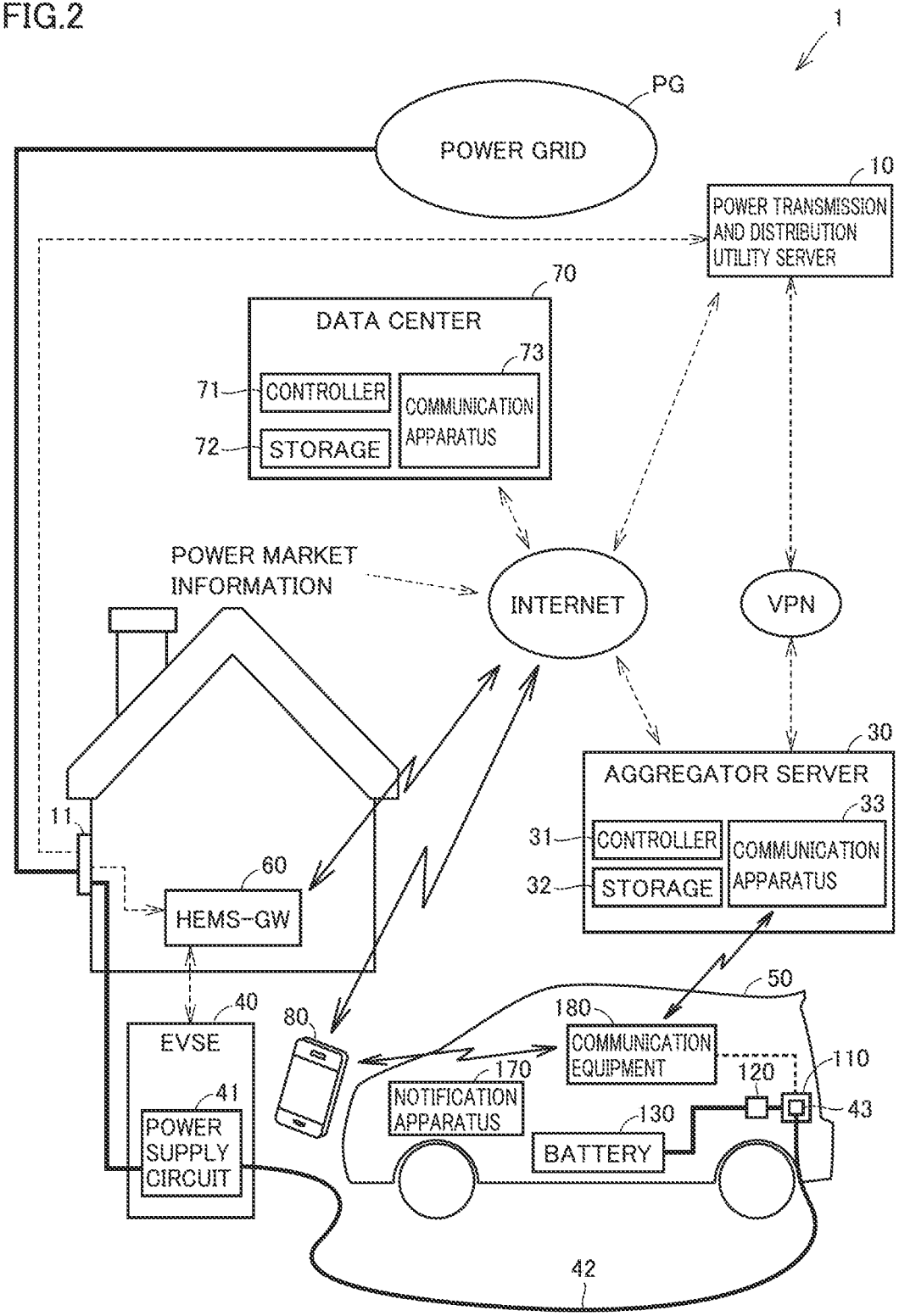
FIG. 2 is a diagram showing a schematic configuration of a power management system according to the embodiment of the present disclosure.

FIG. 2 is a diagram showing a schematic configuration of the power management system according to this embodiment. A VGI system 1 shown in FIG. 2 corresponds to an exemplary "power management system" according to the present disclosure. Though FIG. 2 shows only one of each of the vehicle, the EVSE, and an aggregator server, VGI system 1 includes a plurality of vehicles, a plurality of pieces of EVSE, and a plurality of aggregator servers. Any independent number of vehicles, pieces of EVSE, and aggregator servers may be included in VGI system 1, and the number may be set to ten or more or one hundred or more. Each vehicle included in VGI system 1 may be a personally owned vehicle (POV) or a MaaS (mobility as a service) vehicle. The MaaS vehicle refers to a vehicle managed by a MaaS entity. Though FIG. 2 shows only a single portable terminal, the portable terminal is carried by each user of the vehicle. Though FIG. 2 illustrates home EVSE, VGI system 1 may include public EVSE that can be used by a large number of unspecified users.

Referring to FIG. 2, VGI system 1 includes a power transmission and distribution utility server 10 (which is also simply referred to as a "server 10" below), a smart meter 11, an aggregator server 30 (which is also simply referred to as a "server 30" below), EVSE 40, vehicle 50 (see FIG. 1), a home energy management system-gateway (HEMS-GW) 60, a data center 70, a portable terminal 80, and a power grid PG. In this embodiment, a smartphone equipped with a touch panel display is adopted as portable terminal 80. Without being limited thereto, any portable terminal can be adopted as portable terminal 80, and a tablet terminal, a wearable device (for example, a smart watch), an electronic key, or a service tool can also be adopted.

Server 10 belongs to a power transmission and distribution utility. In this embodiment, an electric power utility company serves also as a power generation utility and a power transmission and distribution utility. The electric power utility company constructs a power network (that is, power grid PG) with a power plant and a power transmission and distribution facility which are not shown, and maintains and manages server 10, smart meter 11, EVSE 40, HEMS-GW 60, and power grid PG. Power grid PG according to this embodiment corresponds to an exemplary "power grid" according to the present disclosure. In this embodiment, the electric power utility company corresponds to a system operator that operates power grid PG.

The electric power utility company can make a profit, for example, by dealing with a demand side (for example, an individual or a company) that uses electric power. The electric power utility company provides each demand side with a smart meter. For example, a user of vehicle 50 shown in FIG. 2 is provided with smart meter 11. A meter ID (identification information for identification of each smart meter) is provided for each smart meter, and server 10 manages a value of measurement by each smart meter as being distinguished based on the meter ID. The electric power utility company can know an amount of power usage for each demand side based on a value of measurement by each smart meter.

In VGI system 1, an ID (identification information) for identification among a plurality of aggregators is provided for each aggregator. Server 10 manages information for each aggregator as being distinguished based on the ID of the aggregator. The aggregator provides an energy management service by putting together amounts of electric power controlled by demand sides under the control thereof. The aggregator can control the amount of electric power by requesting each demand side to level electric power by using a DR signal.

Server 30 belongs to an aggregator. Server 30 includes a controller 31, a storage 32, and a communication apparatus 33. Controller 31 includes a processor, performs prescribed information processing, and controls communication apparatus 33. Details of the configuration of server 30 will be described later. In VGI system 1, an electrically powered vehicle (for example, a POV or a MaaS vehicle) is adopted as DSR managed by the aggregator (and server 30). A demand side can control an amount of electric power by means of the electrically powered vehicle. The aggregator may procure capacity (capability of supply of electricity) not only from vehicle 50 but also from a resource other than vehicle 50 (for example, a vending machine, a plant factory, or biomass). The aggregator can make a profit, for example, by dealing with an electric power utility company. The aggregator may be divided into an upper aggregator that contacts a power transmission and distribution utility (for example, the electric power utility company) and a lower aggregator that contacts a demand side.

Data center 70 includes a controller 71, a storage 72, and a communication apparatus 73. Controller 71 includes a processor, performs prescribed information processing, and controls communication apparatus 73. Storage 72 can store various types of information. Communication apparatus 73 includes various types of communication I/Fs. Controller 71 communicates with the outside through communication apparatus 73. Data center 70 manages information on a plurality of registered portable terminals (including portable terminals 80). Information on the portable terminal includes not only information on the terminal itself but also information on a user who carries the portable terminal. Examples of the information on the terminal itself include a communication address of the portable terminal. Examples of the information on the user include a vehicle ID of vehicle 50 belonging to the user. A terminal ID (identification information for identification of the portable terminal) is provided for each portable terminal and data center 70 manages information for each portable terminal as being distinguished based on the terminal ID. The terminal ID also functions as a user ID (information for identification of a user).

Prescribed application software (which is simply referred to as an "application" below) is installed in portable terminal 80, and portable terminal 80 exchanges information with each of server 30, HEMS-GW 60 and data center 70 through the application. Portable terminal 80 wirelessly communicates with each of server 30, HEMS-GW 60 and data center 70, for example, through the Internet. A user can transmit information representing a state and a schedule of the user to data center 70 by operating portable terminal 80. Exemplary information representing a state of the user includes information indicating whether or not the user is in a condition of being ready for addressing DR. Exemplary information representing the schedule of the user includes time of departure of a POV from home or a drive plan of a MaaS vehicle. Each of server 30 and data center 70 stores the information received from portable terminal 80 as being distinguished for each terminal ID.

Server 10 and server 30 can communicate with each other, for example, through a virtual private network (VPN). Each of servers 10 and 30 can obtain power market information (for example, information on trading of electric power), for example, through the Internet. A protocol of communication between server 10 and server 30 may be OpenADR. Server 30 and data center 70 can communicate with each other, for example, through the Internet. A protocol of communication between server 30 and data center 70 may be OpenADR. Server 30 can obtain information on a user from data center 70. Each of server 30 and data center 70 can communicate with HEMS-GW 60, for example, through the Internet. A protocol of communication between each of server 30 and data center 70 and HEMS-GW 60 may be OpenADR.

Though server 30 and EVSE 40 do not communicate with each other in this embodiment, server 30 and EVSE 40 may communicate with each other. Server 30 may communicate with vehicle 50 with EVSE 40 being interposed. EVSE 40 may communicate with an EVSE management cloud. A protocol of communication between EVSE 40 and the EVSE management cloud may be open charge point protocol (OCPP).

Server 30 sequentially obtains from each vehicle 50, information representing a state or schedule of each vehicle 50 (for example, a position of the vehicle, an ON/OFF state of a start switch, a state of connection of the charging cable, a state of the battery, a charging schedule, a condition for charging, a power feed schedule, a condition for power feed, a schedule of travel, and a condition for travel) under the control thereof and stores the information. The start switch is a switch for starting a vehicle system, and generally referred to as a "power switch" or an "ignition switch." The state of connection of the charging cable is information on whether or not connector 43 of charging cable 42 is connected to inlet 110. The state of the battery is information on a value of an SOC of battery 130 and information indicating whether or not battery 130 is being charged. The charging schedule is information indicating time of start and end of scheduled external charging. The condition for charging may be a condition for scheduled external charging (for example, charging power) or a condition for external charging that is currently ongoing (for example, charging power and a remaining time period of charging). The power feed schedule is information indicating time of start and end of scheduled external power feed. The condition for power feed may be a condition for scheduled external power feed (for example, feed power) or a condition for external power feed that is currently ongoing (for example, feed power and a remaining time period for power feed). The schedule of travel is information indicating time of start and end of scheduled travel. The condition for travel may be a condition for scheduled travel (for example, a travel route and a travel distance) or a condition for travel that is currently ongoing (for example, a traveling speed and a remaining distance of travel).

Server 10 levels electric power by using demand response (DR). When server 10 levels electric power, initially, the server transmits a signal (which is also referred to as a "DR participation request" below) requesting participation into DR to each aggregator server (including server 30). The DR participation request includes a region of interest of DR, a type of DR (for example, DR suppression or DR increase), and a DR period. When server 30 receives a DR participation request from server 10, it calculates an adjustable DR amount (that is, an amount of electric power that can be adjusted in accordance with DR) and transmits the amount to server 10. Server 30 can calculate the adjustable DR amount, for example, based on a total of DR capacities of demand sides under the control thereof. The DR capacity refers to a capacity secured by a demand side for DR.

Server 10 determines a DR amount (that is, an amount of power regulation asked to an aggregator) for each aggregator based on the adjustable DR amount received from each aggregator server and transmits a signal (which is also referred to as a "DR execution instruction" below) instructing each aggregator server (including server 30) to execute DR. The DR execution instruction includes a region of interest of DR, a type of DR (for example, DR suppression or DR increase), a DR amount for the aggregator, and a DR period. When server 30 receives the DR execution instruction, it allocates the DR amount to each vehicle 50 that can address DR among vehicles 50 under the control thereof, generates a DR signal for each vehicle, and transmits the DR signal to each vehicle 50. The DR signal may be a price signal that urges a user of vehicle 50 to regulate supply and demand or a charging command or a power feed command for server 30 to directly control vehicle 50. The price signal may include a type of DR (for example, DR suppression or DR increase), a DR amount for vehicle 50, a DR period, and incentive information. The price signal may be transmitted to portable terminal 80 instead of or in addition to vehicle 50. When vehicle 50 permits remote control (for example, dispatching by server 30), server 30 can directly control vehicle 50 by transmitting a charging command or a power feed command to vehicle 50.

ECU 150 receives a DR signal through communication equipment 180 from the outside of the vehicle. When ECU 150 receives the DR signal, a user of vehicle 50 can contribute to regulation of supply and demand of electric power requested by an electric utility (for example, an electric power utility company or an aggregator) by carrying out external charging or external power feed in accordance with the DR signal by using EVSE 40 and vehicle 50. The electric utility can request the user of vehicle 50 to regulate supply and demand of electric power by transmitting the DR signal. The DR signal may be transmitted from server 30 to vehicle 50 in response to a DR execution instruction as described above. The DR signal may also be transmitted from server 30 to vehicle 50 based on power market information (see, for example, FIG. 6 which will be described later). In this embodiment, when the user of vehicle 50 has contributed to regulation of supply and demand of electric power requested by the electric utility, an incentive in accordance with contribution is paid to the user of vehicle 50 by the electric utility based on an agreement between the user of vehicle 50 and the electric utility.

An electric utility measures contribution with any method. The electric utility may find a contribution based on a measurement value from smart meter 11. VGI system 1 may include, in addition to smart meter 11, a wattmeter (for example, a not-shown smart meter) that measures a contribution. The electric utility may find a contribution based on a measurement value from a wattmeter (not shown) contained in EVSE 40. The electric utility may find a contribution based on a measurement value from a sensor (for example, monitoring module 121 or 131) mounted on vehicle 50. A portable charging cable may be provided with a metering function and the electric utility may find a contribution based on an amount of electric power measured by the charging cable. A user ID may be provided for each charging cable and the user ID may automatically be transmitted from the charging cable to a server (for example, server 10 or 30) of the electric utility when the user uses the charging cable. By doing so, the electric utility can identify which user has carried out charging and discharging.

Vehicle 50 shown in FIG. 2 is electrically connected to outdoor EVSE 40 through charging cable 42 while it is parked in a parking space of a residence (for example, a user's house). EVSE 40 is a non-public charging facility used only by a user and a family member of the user. In this embodiment, EVSE 40 is a charging facility adapted to backfeeding (that is, a charging and discharging facility). As connector 43 of charging cable 42 connected to EVSE 40 is connected to inlet 110 of vehicle 50, vehicle 50 and EVSE 40 can communicate with each other and electric power can be supplied and received between EVSE 40 and vehicle 50. Power supply circuit 41 included in EVSE 40 is electrically connected to power grid PG. For example, as electric power is supplied from power grid PG through power supply circuit 41 and charging cable 42 to vehicle 50, battery 130 is externally charged. As vehicle 50 carries out external power feed to EVSE 40, electric power can be backfed from vehicle 50 through charging cable 42 and power supply circuit 41 to power grid PG. Power supply circuit 41 converts electric power supplied from power grid PG into electric power suitable for external charging and converts electric power supplied from vehicle 50 into electric power suitable for backfeeding.

Power supply circuit 41 is connected to power grid PG provided by the electric power utility company with smart meter 11 being interposed. Smart meter 11 measures an amount of electric power supplied from EVSE 40 to vehicle 50. Smart meter 11 may also measure an amount of electric power backfed from vehicle 50 to EVSE 40. Smart meter 11 measures an amount of power usage each time a prescribed time period elapses (for example, each time thirty minutes elapse), stores the measured amount of power usage, and transmits the measured amount of power usage to server 10 and HEMS-GW 60. For example, IEC (DLMS/COSEM) can be adopted as a protocol for communication between smart meter 11 and server 10. Server 10 transmits at any time, a value of measurement by smart meter 11 to server 30. Server 10 may transmit the measurement value regularly or upon request from server 30.

HEMS-GW 60 transmits information on energy management (for example, information representing a state of use of electric power) to each of server 30, data center 70, and portable terminal 80. HEMS-GW 60 receives a value of measurement of the amount of electric power from smart meter 11. Smart meter 11 and HEMS-GW 60 may communicate with each other in any type of communication, and the type of communication may be a 920-MHz-band low-power wireless communication or power line communication (PLC). HEMS-GW 60 and EVSE 40 can communicate with each other, for example, through a local area network (LAN). The LAN may be wired or wireless LAN. Standards of communication between HEMS-GW 60 and EVSE 40 may be any of ECHONET Lite, smart energy profile (SEP) 2.0, and KNX.

Communication equipment 180 mounted on vehicle 50 communicates with EVSE 40 through charging cable 42. Communication between EVSE 40 and vehicle 50 may be of any type, and for example, controller area network (CAN) or PLC may be adopted. Standards of communication between EVSE 40 and vehicle 50 may be ISO/IEC15118 or IEC61851.

Communication equipment 180 wirelessly communicates with server 30, for example, through a mobile communication network (telematics). A signal exchanged between vehicle 50 and server 30 may be encrypted by a scheme designated by an aggregator. In this embodiment, communication equipment 180 and portable terminal 80 wirelessly communicate with each other. ECU 150 (FIG. 1) can control portable terminal 80 through wireless communication to give a notification to a user. Communication equipment 180 and portable terminal 80 may communicate with each other through short-range communication such as Bluetooth® (for example, direct communication in a vehicle or within an area around the vehicle).

Figure 3:
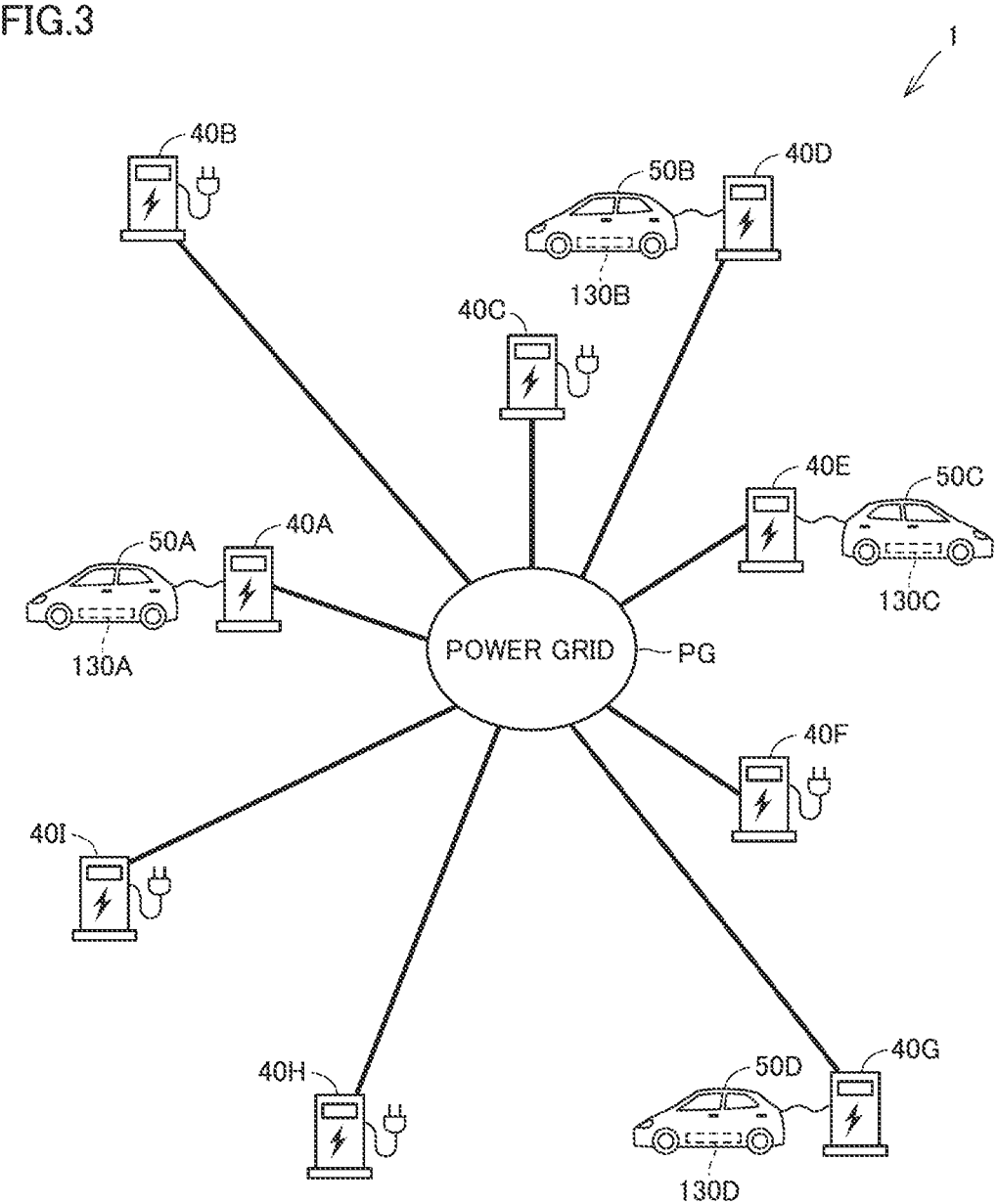
FIG. 3 is a diagram showing a power grid, a plurality of pieces of EVSE, and a plurality of vehicles included in the power management system according to the embodiment of the present disclosure.

FIG. 3 is a diagram showing a power grid, a plurality of pieces of EVSE, and a plurality of vehicles included in the power management system according to this embodiment. Referring to FIG. 3, VGI system 1 includes EVSE 40A to 40I, vehicles 50A to 50D, and power grid PG. Vehicles 50A to 50D include batteries 130A to 130D, respectively. Each of batteries 130A to 130D is capable of both of external charging and external power feed. Each of pieces of EVSE 40A to 40I corresponds to an exemplary "power facility" according to the present disclosure.

Power grid PG supplies electric power to each of pieces of EVSE 40A to 40I. Each of vehicles 50A to 50D can electrically be connected to power grid PG through any of pieces of EVSE 40A to 40I. In the example shown in FIG. 3, vehicles 50A, 50B, 50C, and 50D are electrically connected to power grid PG through EVSE 40A, 40D, 40E, and 40G, respectively. Power grid PG can supply electric power to vehicles 50A to 50D through EVSE 40A, 40D, 40E, and 40G, respectively.

In the power management system (VGI system 1) according to this embodiment, the user of vehicle 50 can receive an incentive by meeting the request from server 30. All users, however, do not place highest priority on the incentive. Some users may prefer suppression of deterioration of battery 130 to reception of the incentive.

Figure 4:
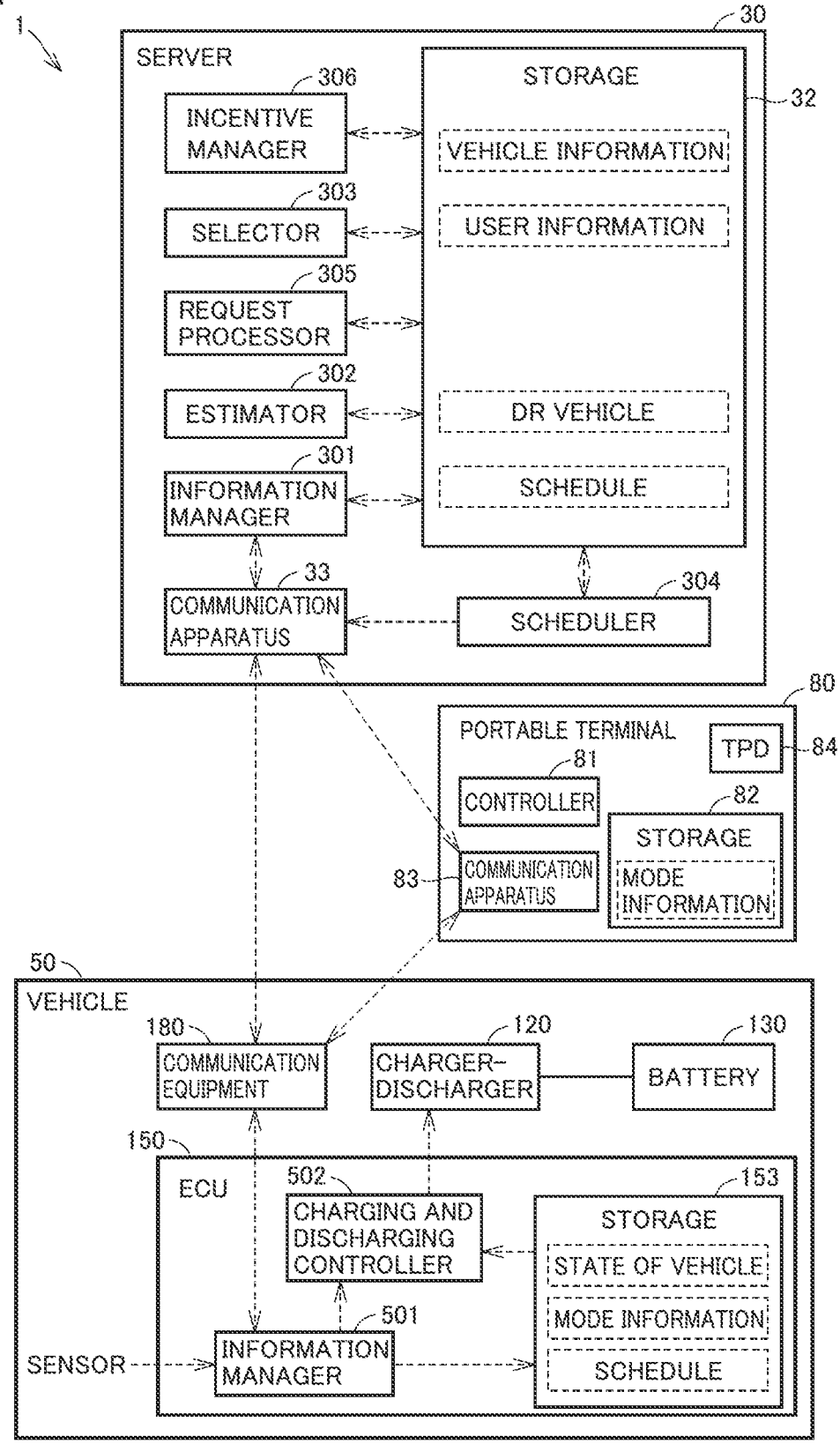
FIG. 4 is a diagram showing a detailed configuration of a vehicle controller, a server, and a portable terminal included in the power management system according to the embodiment of the present disclosure.

In the power management system (VGI system 1) according to this embodiment, vehicle 50, server 30, and portable terminal 80 are configured as described below, so that server 30 can a request a user of vehicle 50 to regulate supply and demand of electric power with attention being paid to a user who desires suppression of deterioration of battery 130. FIG. 4 is a diagram showing a detailed configuration of ECU 150 of vehicle 50, server 30, and portable terminal 80.

Referring to FIG. 4, portable terminal 80 includes a controller 81, a storage 82, a communication apparatus 83, and a touch panel display (TPD) 84. Controller 81 includes a processor, performs prescribed information processing, and controls communication apparatus 83 and TPD 84. Storage 82 can store various types of information. Communication apparatus 83 includes various communication I/Fs. Controller 81 communicates with the outside through communication apparatus 83. Portable terminal 80 is carried by a user of vehicle 50 and TPD 84 gives a notification (for example, representation) to a user of vehicle 50. The notification may be provided by voice and sound, without being limited to representation.

Server 30 can communicate with each of communication equipment 180 of vehicle 50 and portable terminal 80. Server 30 includes an information manager 301, an estimator 302, a selector 303, a scheduler 304, a request processor 305, and an incentive manager 306. In server 30 according to this embodiment, each component above is implemented by the processor of controller 31 shown in FIG. 2 and a program executed by the processor. Without being limited as such, each component above may be implemented by dedicated hardware (electronic circuitry).

ECU 150 includes an information manager 501 and a charging and discharging controller 502. In ECU 150 according to this embodiment, each component above is implemented by processor 151 shown in FIG. 1 and a program executed by processor 151. Without being limited as such, each component above may be implemented by dedicated hardware (electronic circuitry).

Information manager 501 of ECU 150 successively transmits information representing a state or a schedule of vehicle 50 described previously to server 30. Information manager 501 can obtain the state of vehicle 50 based on outputs from various sensors mounted on vehicle 50. Information manager 301 of server 30 has storage 32 store information received from vehicle 50 in association with a vehicle ID of vehicle 50.

Estimator 302 of server 30 estimates next departure time of vehicle 50 based on history data included in the information received from the vehicle. In this embodiment, estimator 302 learns a time period for which vehicle 50 stays (that is, a time period from arrival of vehicle 50 at a charging location until departure from the charging location) from history data of vehicle 50. Information manager 301 has storage 32 store history data to be used for learning of the time period of stay among pieces of information received from vehicle 50, as being distinguished for each charging location. The history data used for learning of the time period of stay is also referred to as "training data" below. In the example shown in FIG. 2, a user's house is the charging location. In this embodiment, history data on a position, arrival time, and departure time of vehicle 50 is adopted as training data. The position of vehicle 50 may be a position detected by the position sensor described previously. Arrival time of vehicle 50 may be timing of connection of connector 43 of charging cable 42 connected to EVSE 40 to inlet 110 of vehicle 50. Departure time of vehicle 50 may be timing of turn-on of the start switch of vehicle 50. Estimator 302 has storage 32 store a result of learning (that is, the time period of stay that has been learnt) as being distinguished for each charging location. Any learning method is applicable. Artificial intelligence (AI) may be used for learning.

In this embodiment, when vehicle 50 arrives at a next charging location, estimator 302 obtains a time period of stay learnt for that next charging location from storage 32. Then, estimator 302 estimates next departure time based on next arrival time (that is, time of arrival of vehicle 50 at the next charging location) and a time period of next stay (that is, the learnt time period of stay). Estimator 302 may estimate as next departure time, timing of lapse of the time period of next stay since next arrival time.

Though details will be described later (see FIG. 6), when server 30 is requested to regulate supply and demand of electric power from the outside (for example, an electric power utility company or a power market), server 30 requests each vehicle 50 under the control thereof to regulate electric power in a procedure as shown below. Initially, selector 303 selects vehicles 50 in number necessary for meeting the request from the outside from among a plurality of vehicles 50 under the control thereof. Each vehicle 50 selected by selector 303 is also referred to as a "DR vehicle" below. Scheduler 304 makes a charging and discharging control schedule (which is simply referred to as a "schedule" below) for battery 130 of each DR vehicle. The schedule may be a charging schedule, a power feed schedule, or a charging suppression schedule. The charging suppression schedule refers to a schedule that shows a period for which charging is restricted (that is, time of start and end of restriction). Examples of charging restriction include prohibition of charging and restriction of charging power (that is, prohibition of charging with prescribed electric power or higher). Each of the DR vehicle selected by selector 303 and the schedule made by scheduler 304 is stored in storage 32 of server 30. Request processor 305 transmits a DR signal for requesting electric power regulation in accordance with the schedule made by scheduler 304 to the user of each DR vehicle. The DR signal requests the user of the DR vehicle to control at least one of external charging and external power feed in accordance with the schedule. The DR signal may be transmitted to communication equipment 180 mounted on the DR vehicle or to portable terminal 80 carried by the user of the DR vehicle. Each of communication equipment 180 and portable terminal 80 corresponds to the communication apparatus registered in server 30 in association with the user of vehicle 50.

The user can receive an incentive from an aggregator by controlling at least one of external charging and external power feed in accordance with the DR signal or permitting remote control of vehicle 50 by server 30 during a period indicated in the schedule. Incentive manager 306 has storage 32 store incentive information of each user as being distinguished based on a user ID. Incentive information includes a unit price of the incentive and an acquired amount of incentive. Incentive manager 306 manages for each user, the unit price of the incentive given to the user at the time when the user meets the request from request processor 305. Incentive manager 306 can change the unit price of the incentive for each user. Any unit price of the incentive may be set, and the unit price of the incentive may be a unit price per one DR of the incentive paid for participation into DR, a unit price per unit electric power amount of the incentive paid for a regulated amount of electric power, or a unit price per unit time of the incentive paid for a time period for which a vehicle is bound. Incentive manager 306 has storage 32 store for each user, also an acquired amount of incentive (that is, the total amount of incentive acquired by the user) in addition to the unit price of the incentive.

When information manager 501 receives the DR signal described above from server 30, the DR signal is stored in storage 153. Charging and discharging controller 502 carries out charging and discharging control of battery 130 by controlling charger-discharger 120. Though remote control of charging and discharging controller 502 is prohibited in principle, it can remotely be controlled by server 30 during a DR period indicated in the schedule included in the DR signal within storage 153. The DR period corresponds to a period from DR start time until DR end time. While charging and discharging controller 502 is remotely controllable, server 30 can directly control charging and discharging controller 502 by transmitting a charging command or a power feed command to vehicle 50. Information manager 501 may suppress unauthorized remote control (for example, remote control by a component other than server 30) by performing prescribed authentication of a received command and excluding the unauthorized command. Permission and prohibition of remote control of charging and discharging controller 502 may be set by a user of vehicle 50 through input apparatus 160 or portable terminal 80.

Figure 5:
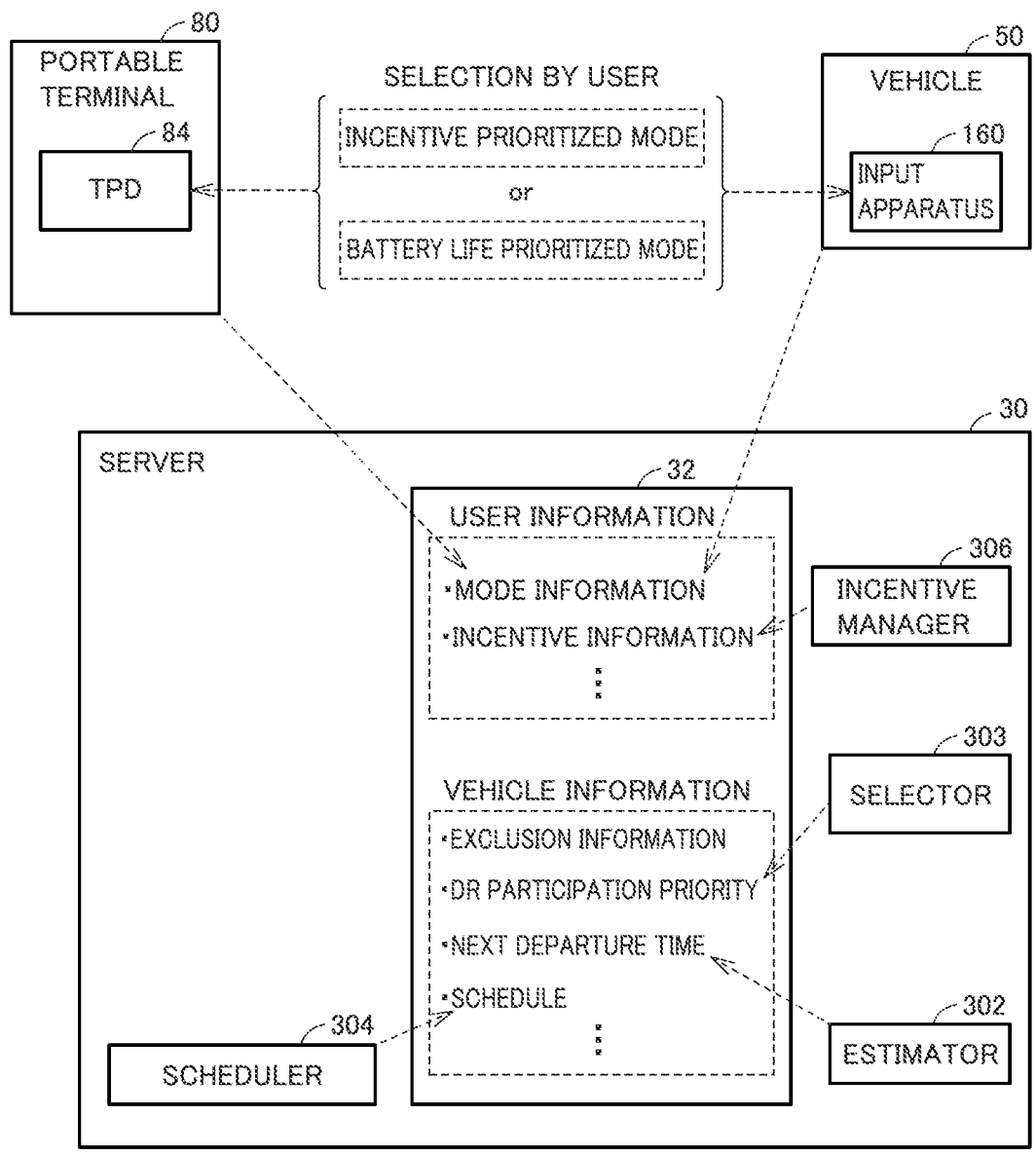
FIG. 5 is a diagram for illustrating details of vehicle information and user information held by the server shown in FIG. 4.

Storage 32 of server 30 stores vehicle information for each vehicle and user information for each user of vehicle 50. FIG. 5 is a diagram for illustrating details of vehicle information and user information held by server 30.

Referring to FIG. 5 together with FIG. 4, the user information in storage 32 includes mode information which will be described below. Each of input apparatus 160 mounted on vehicle 50 and TPD 84 of portable terminal 80 carried by the user of vehicle 50 accepts input from the user of vehicle 50. Each of notification apparatus 170 (FIG. 1) of vehicle 50 and TPD 84 of portable terminal 80 may issue a request for input of any of an incentive prioritized mode and a battery life prioritized mode to the user of vehicle 50 through representation or voice and sound. When the user of vehicle 50 inputs any mode to input apparatus 160 or TPD 84 in response to the request, ECU 150 of vehicle 50 or controller 81 of portable terminal 80 controls storage 153 or storage 82 to store the mode information (that is, information indicating the mode selected by the user) and transmits the mode information to server 30. Server 30 controls storage 32 to store the received mode information in association with a user ID. In this embodiment, the mode information corresponds to exemplary "first desire information" and exemplary "second desire information" according to the present disclosure. Selection of the battery life prioritized mode by the user means that the user desires suppression of deterioration of battery 130 but does not desire acquisition of the incentive. Selection of the incentive prioritized mode by the user means that the user does not desire suppression of deterioration of battery 130 but desires acquisition of the incentive. In this embodiment, input apparatus 160 and ECU 150 mounted on vehicle 50 function as the "user terminal" according to the present disclosure.

The user information further includes the incentive information described previously. Incentive manager 306 sets a higher unit price of the incentive for a user lower in level of the user's desire for suppression of deterioration of battery 130, by referring to the mode information. Specifically, incentive manager 306 sets the unit price of the incentive for the user who has selected the incentive prioritized mode to be higher than the unit price of the incentive for the user who has selected the battery life prioritized mode.

The vehicle information in storage 32 includes exclusion information, DR participation priority, next departure time, and a schedule. The exclusion information is information for selection of a vehicle not suitable as a DR vehicle. In this embodiment, the SOC of battery 130 and the number of times of charging per unit period are adopted as exclusion information. A first threshold value, a second threshold value, and an upper limit value which will be described later are also included in the exclusion information.

Though details will be described later, selector 303 determines the DR participation priority for each vehicle based on the mode information described previously. Vehicle 50 higher in DR participation priority is more likely to be selected in selection of the DR vehicle (see FIG. 7 which will be described later). Next departure time is estimated by estimator 302 with the method described previously and stored in storage 32. Scheduler 304 makes a schedule for each vehicle based on the mode information and next departure time (see FIG. 6 which will be described later).

Figure 6:
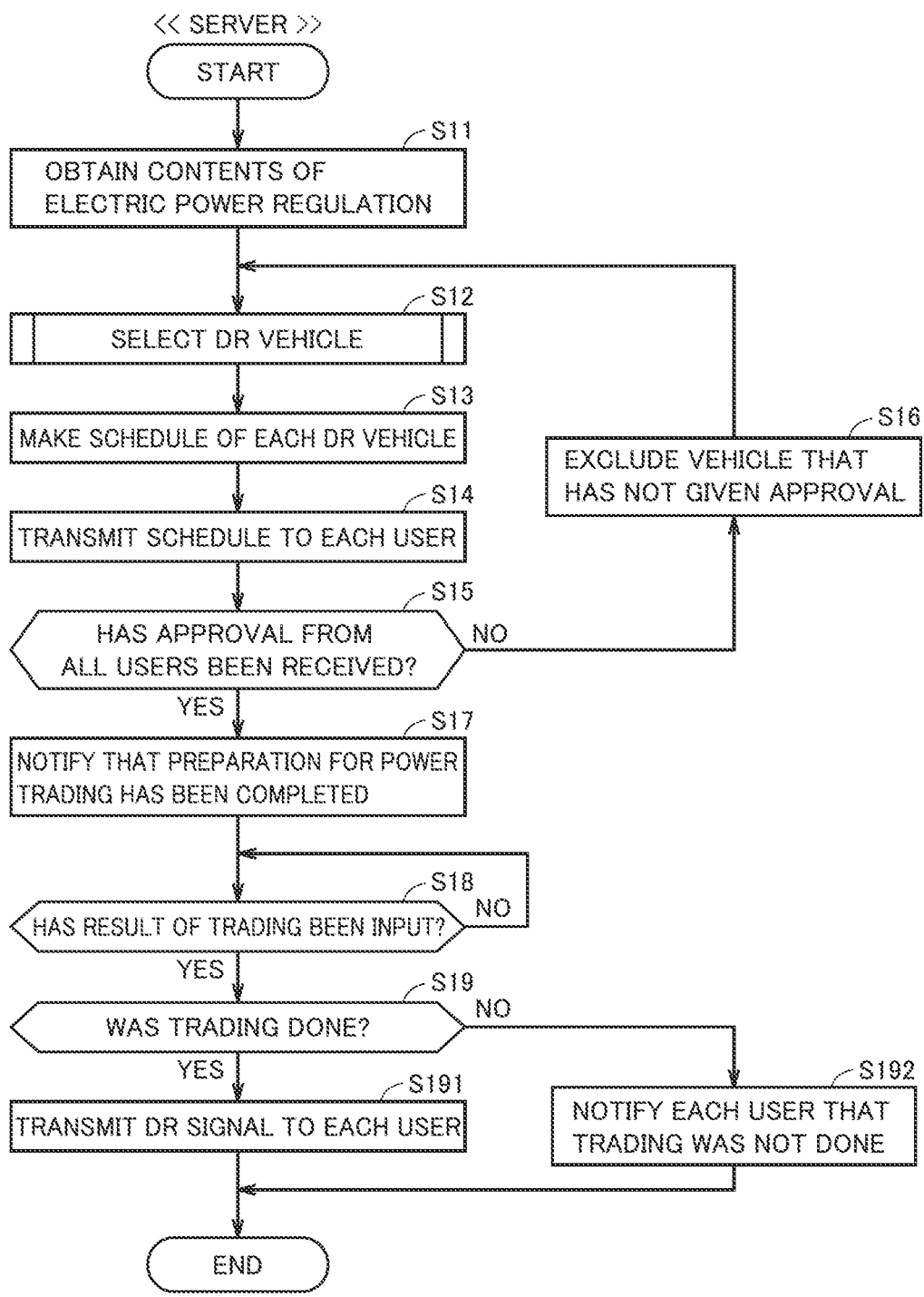
FIG. 6 is a flowchart showing processing performed by the server when an aggregator trades electric power in a power market in the power management system according to the embodiment of the present disclosure.

FIG. 6 is a flowchart showing processing performed by server 30 when an aggregator trades electric power in a power market. Processing shown in this flowchart is started in response to input by the aggregator of contents of electric power regulation requested in the power market to server 30 when regulation of supply and demand of power grid PG is requested in the power market. Contents of electric power regulation input to server 30 are also referred to as "request contents" below.

Referring to FIG. 6 together with FIGS. 1 to 5, in a step (which is simply denoted as "S" below) 11, controller 31 of server 30 obtains request contents (that is, contents of electric power regulation) input by the aggregator. The request contents include a type of electric power regulation (for example, a request for external charging or a request for external power feed), an amount of electric power regulation, and a request period.

Figure 7:
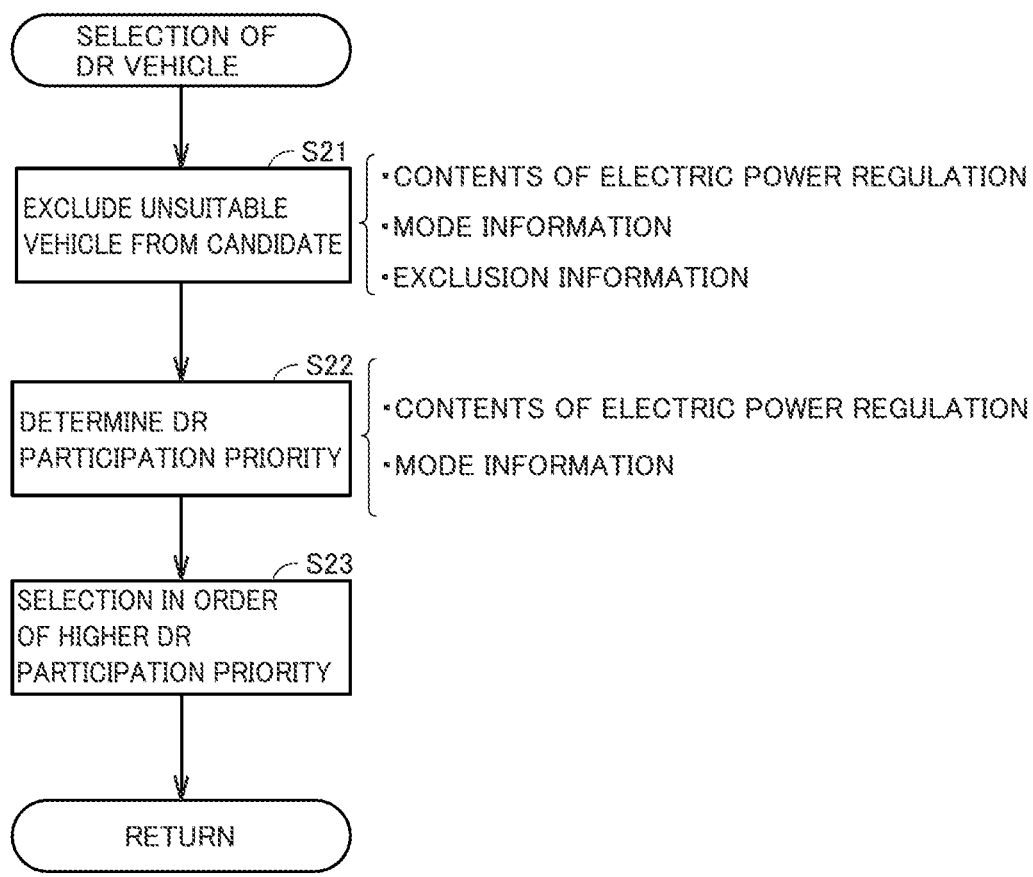
FIG. 7 is a flowchart showing details of processing involved with selection of a DR vehicle shown in FIG. 6.

In S12, selector 303 of server 30 selects a DR vehicle to which a request for electric power regulation is to be issued, from among vehicles 50 under the control thereof. FIG. 7 is a flowchart showing details of processing involved with selection of a DR vehicle made in S12 in FIG. 6.

Referring to FIG. 7 together with FIGS. 1 to 6, in S21, selector 303 of server 30 excludes an unsuitable vehicle (that is, a vehicle not suitable as the DR vehicle) from candidates for the DR vehicle based on the request contents obtained in S11 in FIG. 6 and the mode information and the exclusion information (FIG. 5) described previously. In an initial stage, all vehicles 50 under the control of the aggregator are included in candidates for the DR vehicle. Thereafter, in S16 in FIG. 6 which will be described later, candidates for the DR vehicle may be narrowed down. Vehicle 50 of a user who has selected the battery life prioritized mode is also referred to as a "first vehicle" below. Vehicle 50 of a user who has selected the incentive prioritized mode is also referred to as a "second vehicle." Selector 303 can determine which of the first vehicle and the second vehicle each vehicle 50 under the control thereof falls under, based on the mode information. Selector 303 sets the upper limit value of the number of times of charging per unit period for each vehicle, based on the mode information. In this embodiment, for the first vehicle, a prescribed number is set as the upper limit value, and for the second vehicle, "none" is set as the upper limit value. The prescribed number corresponds to the threshold value for suppression of progress of deterioration of battery 130 due to repeated charging.

Figure 8:
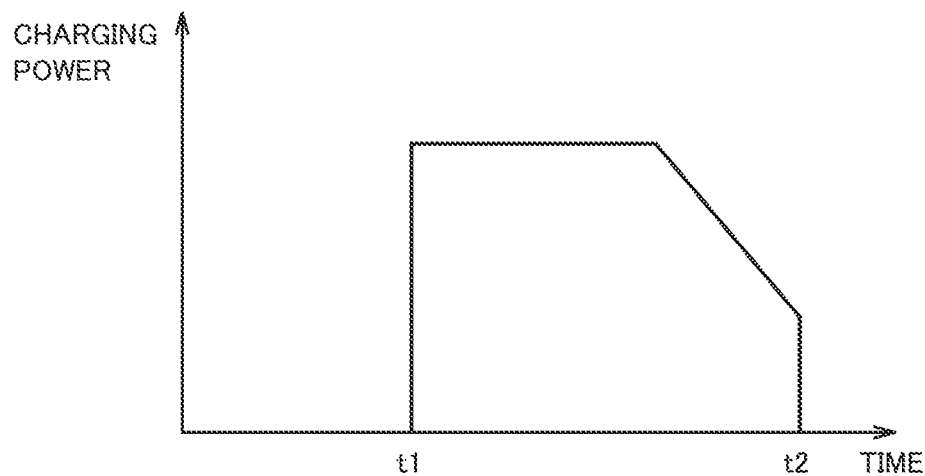
FIG. 8 is a diagram showing an exemplary charging schedule in which the number of times of charging is set to one.
Figure 9:
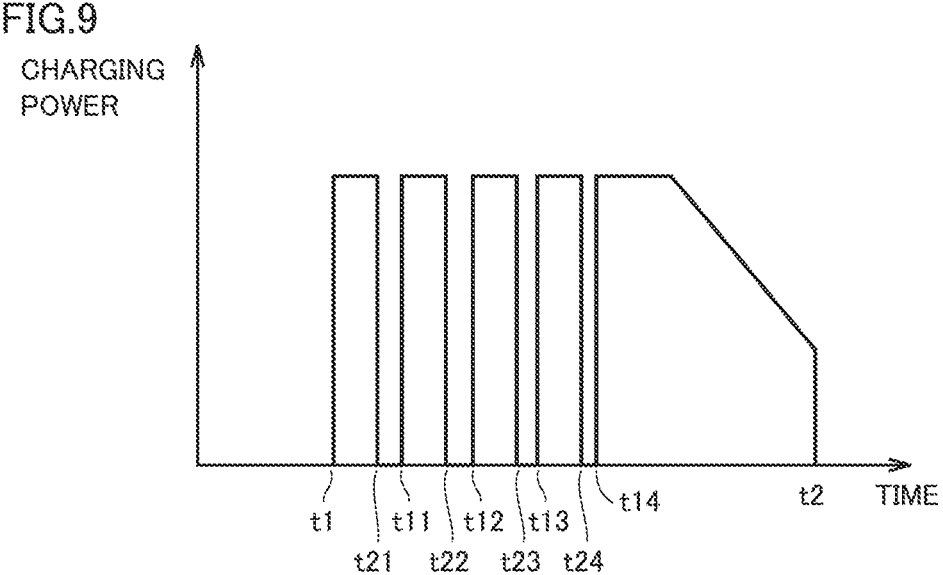
FIG. 9 is a diagram showing an exemplary charging schedule in which the number of times of charging is set to five.

In this embodiment, the number of times of charging per one day is adopted as the number of times of charging per unit period. Ten times is adopted as the upper limit value set for the first vehicle. A process from start of charging until stop of charging is counted as one charging. How to count the number of times of charging will be described below with reference to FIGS. 8 and 9. FIG. 8 is a diagram showing an exemplary charging schedule in which the number of times of charging is set to one. Referring to FIG. 8, in this charging schedule, charging is started at timing t1 and stopped at timing t2. Therefore, external charging in vehicle 50 in accordance with the charging schedule shown in FIG. 8 increments the number of times of charging of battery 130 by one. FIG. 9 is a diagram showing an exemplary charging schedule in which the number of times of charging is set to five. Referring to FIG. 9, in this charging schedule, charging is intermittently carried out. First charging is started at timing t1 and stopped at timing t21. Second charging is started at timing t11 and stopped at timing t22. Third charging is started at timing t12 and stopped at timing t23. Fourth charging is started at timing t13 and stopped at timing t24. Fifth charging is started at timing t14 and stopped at timing t2. Therefore, external charging in vehicle 50 in accordance with the charging schedule shown in FIG. 9 increments the number of times of charging of battery 130 by five.

Referring again to FIG. 7, in S21, selector 303 excludes the first vehicle of which the number of times of charging per one day has exceeded ten times from candidates for the DR vehicle. The upper limit value for the first vehicle may be fixed or variable depending on the request contents.

When the request contents obtained in S11 in FIG. 6 request for external power feed, in S21, selector 303 excludes vehicle 50 in which the SOC of battery 130 is smaller than a prescribed first threshold value from candidates for the DR vehicle. Though any first threshold value can be set, for example, an SOC value selected within a range not lower than 15% and not higher than 50% may be set. When the request contents obtained in S11 in FIG. 6 request for external charging, in S21, selector 303 excludes vehicle 50 in which the SOC of battery 130 exceeds a prescribed second threshold value from candidates for the DR vehicle. Though any second threshold value can be set, an SOC value selected, for example, within a range not lower than 50% and not higher than 85% may be set.

In S22, selector 303 determines the DR participation priority of each vehicle 50 which is the candidate for the DR vehicle, based on the request contents obtained in S11 in FIG. 6 and the mode information (FIG. 5) described previously. When the request contents obtained in S11 in FIG. 6 request for external power feed, selector 303 sets the DR participation priority of the first vehicle to be higher than the DR participation priority of the second vehicle. When the request contents obtained in S11 in FIG. 6 request for external charging, selector 303 sets the DR participation priority of the second vehicle to be higher than the DR participation priority of the first vehicle. The first vehicles may be identical in DR participation priority, or varied in DR participation priority in accordance with a reference other than the mode information. For example, the SOC of battery 130 may be adopted as the reference other than the mode information. In selection of a DR vehicle to which a request for external power feed is to be issued, selector 303 may set the DR participation priority of the first vehicle higher in SOC of battery 130 to be higher. In selection of a DR vehicle to which a request for external charging is to be issued, selector 303 may set the DR participation priority of the first vehicle lower in SOC of battery 130 to be higher. The second vehicles may also be identical in DR participation priority, or varied in DR participation priority in accordance with a reference other than the mode information, similarly to the first vehicles.

Figure 10:
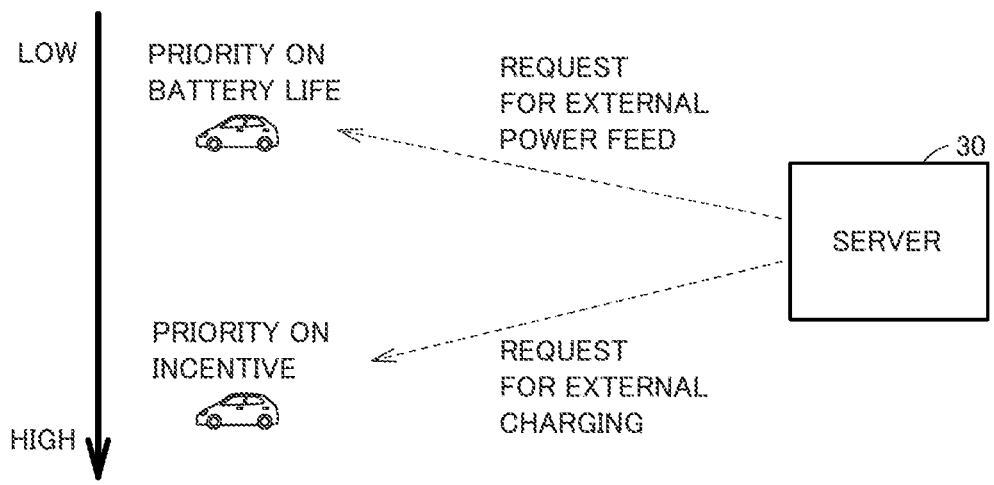
FIG. 10 is a diagram for illustrating selection of a DR vehicle made in the processing shown in FIG. 7.

In S23, selector 303 selects a DR vehicle in accordance with the DR participation priority of each vehicle 50 determined in S22. Selector 303 selects a prescribed number (more specifically, a number necessary for meeting the request contents) of DR vehicles from among candidates for the DR vehicle in the order of higher DR participation priority. FIG. 10 is a diagram for illustrating selection of a DR vehicle.

Referring to FIG. 10, when the request contents request for external charging, selector 303 preferentially makes selection from among the second vehicles (that place priority on the incentive). Specifically, when the request contents request for external charging, vehicle 50 lower in level of the user's desire for suppression of deterioration of battery 130 (that is, higher in level of the user's desire for acquisition of the incentive) is preferentially sequentially selected from among vehicles 50 in which the SOC of battery 130 is equal to or smaller than the second threshold value. When there are a sufficient number of the second vehicles, all selected DR vehicles fall under the second vehicles. When there are an insufficient number of the second vehicles, the selected DR vehicles include both of the first vehicles and the second vehicles. When the request contents request for external power feed, selector 303 preferentially makes selection from among the first vehicles (that place priority on battery life). Specifically, when the request contents request for external power feed, vehicle 50 higher in level of the user's desire for suppression of deterioration of battery 130 (that is, lower in level of the user's desire for acquisition of the incentive) is preferentially sequentially selected from among vehicles 50 in which the SOC of battery 130 is equal to or larger than the first threshold value. When there are a sufficient number of the first vehicles, all selected DR vehicles fall under the first vehicles. When there are an insufficient number of the first vehicles, the selected DR vehicles include both of the first vehicles and the second vehicles. When the first vehicle (that places priority on battery life) is preferentially selected, an opportunity for the user of the second vehicle (that places priority on the incentive) to acquire the incentive may be lost. Then, incentive manager 306 sets the unit price of the incentive of the user of the second vehicle (that places priority on the incentive) to be higher than the unit price of the incentive for the user of the first vehicle (that places priority on battery life). Thus, the user of the second vehicle (that places priority on the incentive) is more likely to acquire the higher incentive at the sacrifice of susceptibility of battery 130 to deterioration. Consequently, fairness among users can be ensured.

When there are a large number of vehicles 50 equal in DR participation priority and a prescribed number of DR vehicles cannot be selected only based on the DR participation priority, selector 303 may narrow down candidates for the DR vehicle based on the DR participation priority and thereafter select the DR vehicles based on an arbitrary reference (or randomly) from among a plurality of vehicles 50 equal in DR participation priority.

As the processing in S23 in FIG. 7 is performed, the processing in S12 in FIG. 6 ends. Thereafter, the process proceeds to S13 in FIG. 6. Referring again to FIG. 6 together with FIGS. 1 to 5, in S13, scheduler 304 of server 30 makes a schedule for each DR vehicle selected in S12. When the request contents obtained in S11 request for external power feed, scheduler 304 makes a power feed schedule that indicates time to start and quit external power feed. When the request contents obtained in S11 request for external charging, scheduler 304 makes a charging schedule that indicates time to start and quit external charging. Scheduler 304 makes a schedule for each DR vehicle based on the mode information and next departure time (FIG. 5).

Figure 11:
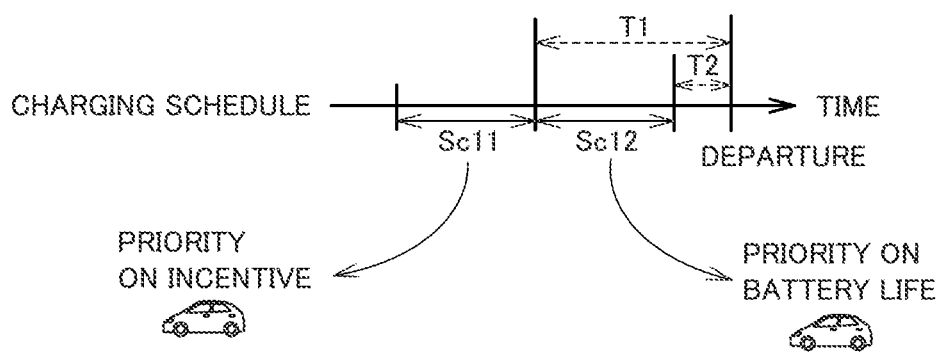
FIG. 11 is a diagram for illustrating making of a charging schedule in the processing shown in FIG. 6.

In making the charging schedule, scheduler 304 makes the charging schedule such that a time lag between charging end time in the charging schedule and next departure time is smaller in a DR vehicle higher in level of the user's desire for suppression of deterioration of battery 130 or a DR vehicle lower in level of the user's desire for acquisition of the incentive. FIG. 11 is a diagram for illustrating making of a charging schedule. Referring to FIG. 11 together with FIGS. 1 to 5, for example, when DR vehicles selected in S12 include the first vehicle (that places priority on battery life) and the second vehicle (that places priority on the incentive) identical in next departure time, scheduler 304 sets a charging schedule Sc11 for the second vehicle to precede a charging schedule Sc12 for the first vehicle. A time lag (that is, a time period T2) between charging end time and next departure time of charging schedule Sc12 is shorter than a time lag (that is, a time period T1) between charging end time and next departure time of charging schedule Sc11. Such schedule setting can achieve suppression of battery 130 of the first vehicle being left stand in the high SOC state and deterioration of battery 130 of the user who has selected the battery life prioritized mode. When there are a large number of first vehicles among DR vehicles selected in S12 and deterioration of batteries 130 of all first vehicles cannot be suppressed, scheduler 304 may select the first vehicle in which deterioration of battery 130 is to be suppressed based on an arbitrary reference (or randomly).

In making the power feed schedule, scheduler 304 makes the power feed schedule such that external power feed is started earlier in the DR vehicle higher in level of the user's desire for suppression of deterioration of battery 130. Specifically, scheduler 304 sets the power feed schedule for the first vehicle to precede the power feed schedule for the second vehicle. When there are a plurality of first vehicles among DR vehicles selected in S12, scheduler 304 may make the power feed schedule for each first vehicle such that external power feed of the first vehicle higher in SOC of battery 130 is started earlier. When there are a plurality of second vehicles among DR vehicles selected in S12, scheduler 304 may make the power feed schedule for each second vehicle such that external power feed of the second vehicle higher in SOC of battery 130 is started earlier.

Referring again to FIG. 6 together with FIGS. 1 to 5, in S14, controller 31 controls communication apparatus 33 to transmit the schedule made in S13 to the user of each DR vehicle and to request the user to give an answer as to whether or not the user approves the schedule. The schedule may be transmitted to communication equipment 180 (FIG. 1) mounted on the DR vehicle or to portable terminal 80 (FIG. 2) carried by the user of the DR vehicle.

In S15, controller 31 determines whether or not all users to which the schedule had been sent have given answers indicating approval of the schedule. This determination is made, for example, at timing of reception of answers from all users to which the schedule had been transmitted or timing of lapse of a prescribed time period since transmission of the schedule. In this embodiment, a user who has not yet transmitted the answer even after lapse of the prescribed time period since transmission of the schedule is handled similarly to a user who has given an answer to the effect that the user does not approve the schedule.

When determination as NO is made in S15 (at least one user has not approved the schedule), in S16, controller 31 excludes a vehicle belonging to the user who has not approved the schedule from candidates for the DR vehicle. Thereafter, the process returns to S12. The vehicle excluded in S16 is not selected in S12 (see FIG. 7). While determination as NO is made in S15, S12 to S16 are repeatedly performed.

When determination as YES is made in S15 (all users have approved the schedule), in S17, controller 31 notifies the aggregator of completion of preparation for electric power trading through a not-shown notification apparatus (for example, a touch panel display). Approval of the schedule by the user of each DR vehicle means that the user of each DR vehicle and the aggregator have reached a provisional agreement. The provisional agreement is a promise to the user of the DR vehicle by the aggregator, of payment of the incentive to the user who meets the request from the aggregator.

As DSR (the DR vehicle) for regulation of electric power is secured as above, the aggregator can trade electric power in the power market, for example, through Japan Electric Power Exchange (JEPX). The aggregator may also make a bid. When trading ends, the aggregator inputs a result (done/not done) of trading into server 30.

After controller 31 of server 30 performs notification processing in S17, in S18, it waits for input from the aggregator. Then, when the result (done/not done) of trading is input from the aggregator (YES in S18), in S19, controller 31 determines whether or not trading of electric power was done.

When trading of electric power was done (YES in S19), in S191, request processor 305 of server 30 transmits a DR signal described previously to the user of each DR vehicle. As the user of each DR vehicle receives the DR signal, a formal agreement is concluded between the user of each DR vehicle and the aggregator. The formal agreement is a promise by the user of each DR vehicle to the aggregator that the user has each DR vehicle stand by such that server 30 can remotely control external charging and external power feed of each DR vehicle during the DR period indicated in the schedule in each DR signal. Conclusion of the formal agreement finalizes the promise in the provisional agreement described previously. The user who has received the DR signal can receive the incentive from the aggregator by having the DR vehicle stand by as above. On the other hand, a penalty is imposed on a user who has broken the promise. When trading of electric power was not done (NO in S19), in S192, request processor 305 of server 30 notifies the user of each DR vehicle that trading was not done. The provisional agreement described previously is withdrawn by this notification.

Figure 12:
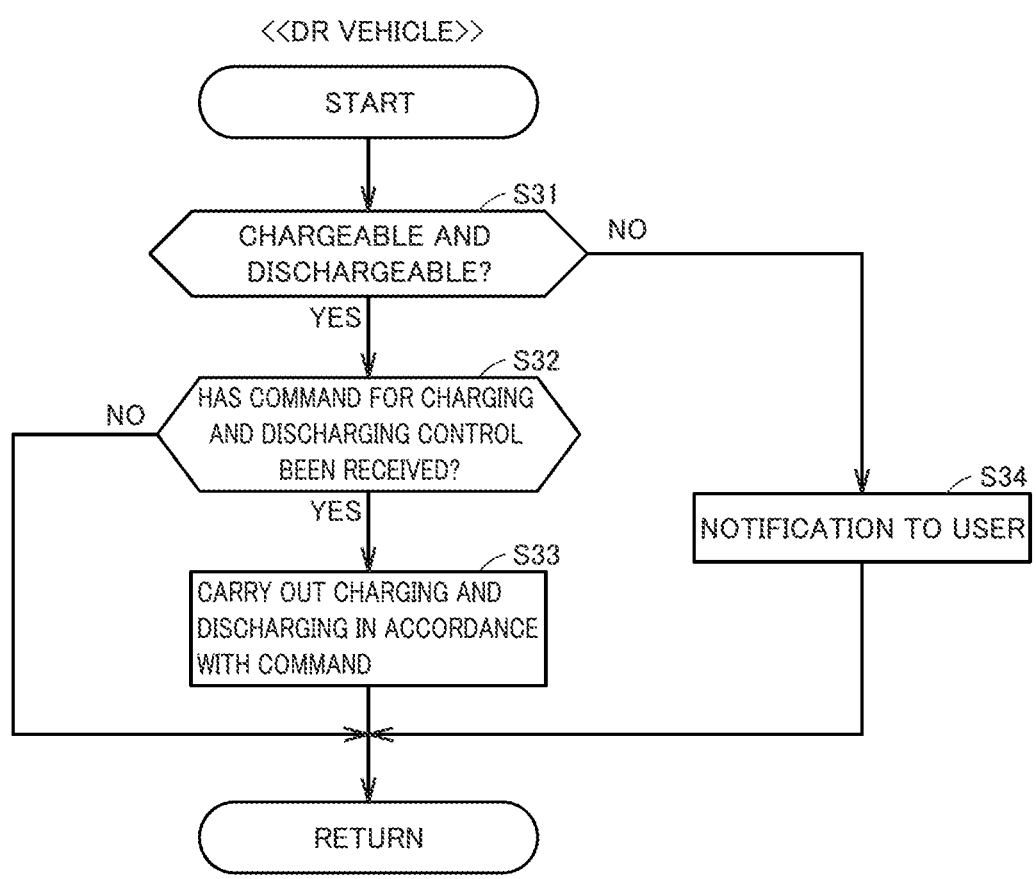
FIG. 12 is a flowchart showing charging and discharging control of a power storage of a DR vehicle in the power management system according to the embodiment of the present disclosure.

FIG. 12 is a flowchart showing charging and discharging control of battery 130 in vehicle 50 finalized as the DR vehicle. Processing shown in this flowchart is repeatedly performed by ECU 150 during the DR period indicated in the schedule included in the DR signal. When the user receives the DR signal, vehicle 50 belonging to that user is finalized as the DR vehicle, and when the DR period elapses, the DR vehicle returns to a non-DR vehicle (that is, vehicle 50 which is not the DR vehicle).

Referring to FIG. 12 together with FIGS. 1 to 5, in S31, charging and discharging controller 502 (FIG. 4) of ECU 150 determines whether or not battery 130 is in a chargeable and dischargeable state based on outputs from various sensors. For example, charging and discharging controller 502 checks a state of connection of charging cable 42, and when electrical connection between the DR vehicle and EVSE 40 is insufficient, the charging and discharging controller determines that battery 130 is not in the chargeable and dischargeable state. When an abnormal condition (for example, communication abnormality or circuit abnormality) occurs in at least one of the DR vehicle and EVSE 40 as well, the charging and discharging controller determines that battery 130 is not in the chargeable and dischargeable state.

When battery 130 is in the chargeable and dischargeable state (YES in S31), in S32, ECU 150 determines whether or not it has received a command for charging and discharging control from server 30. When the ECU has received the command from server 30 (YES in S32), in S33, charging and discharging controller 502 carries out charging and discharging control of battery 130 in accordance with the command. While ECU 150 continues to receive the command from server 30, processing in S31 to S33 is repeated. Server 30 transmits a command to each DR vehicle in accordance with the schedule included in each DR signal. Therefore, control of charging and discharging controller 502 of each DR vehicle in accordance with the command from server 30 means control of external charging and external power feed of each DR vehicle in accordance with the schedule included in each DR signal.

For a period during which ECU 150 does not receive the command from server 30 (NO in S32), ECU 150 waits for a command from server 30 while it repeats processing in S31 and S32.

When determination as NO is made in S31 (battery 130 is not in the chargeable and dischargeable state), the process proceeds to S34. In S34, ECU 150 controls notification apparatus 170 (FIG. 1) to notify the user of the DR vehicle that battery 130 is not in the chargeable and dischargeable state. This notification may be given by TPD 84 of portable terminal 80. Determination as NO in S31 means that server 30 is unable to control external charging and external power feed of the DR vehicle by remote control (and a penalty is imposed on the user).

Figure 13:
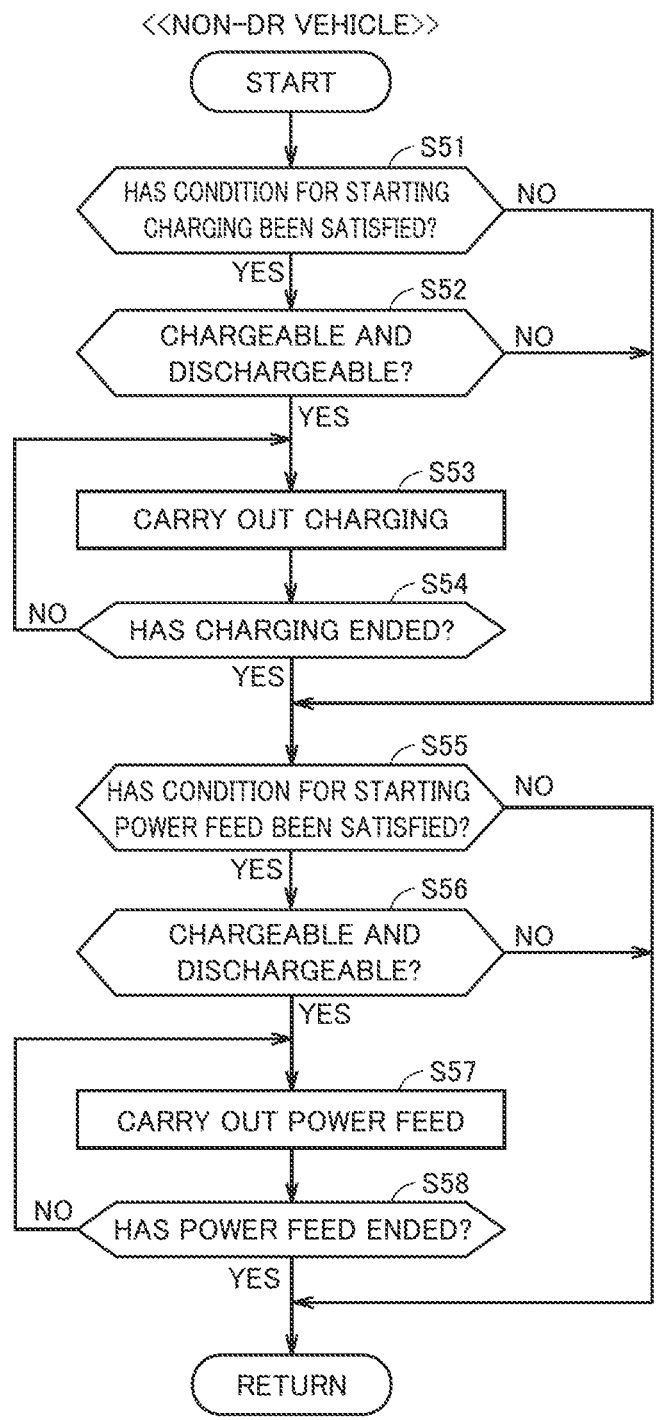
FIG. 13 is a flowchart showing charging and discharging control of a power storage of a non-DR vehicle in the power management system according to the embodiment of the present disclosure.

FIG. 13 is a flowchart showing charging and discharging control of battery 130 of a non-DR vehicle. Processing shown in this flowchart is repeatedly performed while the non-DR vehicle is parked.

Referring to FIG. 13 together with FIGS. 1 to 5, in S51, whether or not a condition for starting external charging has been satisfied is determined. In this embodiment, when time to start charging that has been timer-programmed in ECU 150 comes, the condition for starting external charging is satisfied. When charging has not been timer-programmed in ECU 150, connection of connector 43 of charging cable 42 connected to EVSE 40 to inlet 110 of vehicle 50 (see FIG. 1) satisfies the condition for starting immediate charging. Immediate charging refers to external charging started immediately when preparation for external charging in vehicle 50 is completed. When a prescribed operation to start charging by the user onto EVSE 40 or vehicle 50 is performed as well, the condition for starting external charging is satisfied. Any operation to start charging can be set. The operation to start charging may be, for example, an operation to press a prescribed button by the user.

Though not shown in FIG. 13, when the condition for starting external charging is satisfied (YES in S51), a start signal is input to ECU 150 and ECU 150 is started up. Started-up ECU 150 performs processing in S52. In S52, ECU 150 determines whether or not battery 130 is in the chargeable and dischargeable state. Processing in S52 is the same, for example, as S31 in FIG. 12.

When battery 130 is in the chargeable and dischargeable state (YES in S52), in S53, charging and discharging controller 502 controls charger-discharger 120 to carry out external charging. Thereafter, in S54, charging and discharging controller 502 determines whether or not a condition for quitting external charging has been satisfied. While determination as NO is made in S54, external charging (S53) is continued. Any condition for quitting external charging can be set. The condition for quitting external charging may be satisfied when the SOC of battery 130 is equal to or larger than a prescribed SOC value during external charging or when a user gives an instruction to stop charging during external charging. When the condition for quitting external charging has been satisfied (YES in S54), the vehicle system (and ECU 150) enters a stop state (for example, a sleep mode) and thereafter the process proceeds to S55. When determination as NO is made in any of S51 and S52 as well, the process proceeds to S55.

In S55, whether or not the condition for starting external power feed has been satisfied is determined. In this embodiment, when a user performs a prescribed operation to start power feed onto EVSE 40 or vehicle 50, the condition for starting external power feed is satisfied. Any operation to start power feed can be set. The operation to start power feed may be, for example, an operation to press a prescribed button by the user.

Though not shown in FIG. 13, when the condition for starting external power feed is satisfied (YES in S55), a start signal is input to ECU 150 and ECU 150 is started up. Then, started-up ECU 150 performs processing in S56. In S56, ECU 150 determines whether or not battery 130 is in the chargeable and dischargeable state. Processing in S56 is the same, for example, as S31 in FIG. 12.

When battery 130 is in the chargeable and dischargeable state (YES in S56), in S57, charging and discharging controller 502 controls charger-discharger 120 to carry out external power feed. Thereafter, in S58, charging and discharging controller 502 determines whether or not a condition for quitting external power feed has been satisfied. While determination as NO is made in S58, external power feed (S57) is continued. Any condition for quitting external power feed can be set. The condition for quitting external power feed may be satisfied when the SOC of battery 130 is equal to or smaller than a prescribed SOC value during external power feed. The condition for quitting external power feed may be satisfied when an amount of electric power (that is, an accumulated value of discharging power of battery 130) supplied from vehicle 50 to EVSE 40 in external power feed has exceeded a prescribed value. The condition for quitting external power feed may be satisfied when the user gives an instruction to stop power feed during external power feed. When the condition for quitting external power feed has been satisfied (YES in S58), the vehicle system (and ECU 150) enters the stop state (for example, the sleep mode) and thereafter the process returns to S51. When determination as NO is made in any of S55 and S56 as well, the process returns to S51.

As described above, in the power management system (VGI system 1) according to this embodiment, server 30 obtains the mode information for each vehicle and makes selection (S12 in FIG. 6) of a DR vehicle and makes a schedule (S13 in FIG. 6) based on the obtained mode information. The mode information indicates a level of the user's desire (any of desiring and not desiring) for suppression of deterioration of battery 130 and a level of the user's desire (any of desiring and not desiring) for acquisition of the incentive. For a request that may cause deterioration of battery 130, in selection of a DR vehicle, server 30 makes the first vehicle (that places priority on battery life) less likely to be selected. In making a schedule for the first vehicle, server 30 makes a schedule in which battery 130 is less likely to deteriorate. The power management system can issue a request for regulation of supply and demand of electric power to a user of vehicle 50 including battery 130 with attention being paid to a user who desires suppression of deterioration of battery 130.

Though desire information (more specifically, mode information) is used for both of selection of a DR vehicle (S12 in FIG. 6) and making of a schedule (S13 in FIG. 6) in the embodiment, the desire information may be used for only any one of selection of a DR vehicle and making of a schedule. For example, in selection of a DR vehicle from among vehicles 50 electrically connected to power grid PG at the current time point for requesting the DR vehicle to participate in DR that is immediately carried out, server 30 may select a DR vehicle based on the desire information.

The mode information is adopted as the desire information in the embodiment. The mode information corresponds to information that indicates a desire level in two levels (priority on battery life or the incentive). The user selecting/not selecting the battery life prioritized mode corresponds to the user desiring/not desiring suppression of deterioration of the power storage. The user selecting/not selecting the incentive prioritized mode corresponds to the user desiring/not desiring acquisition of the incentive. The desire information, however, is not limited to information that indicates the desire level in two levels. The desire information may be information that indicates the desire level in three or more levels (for example, five levels) or information that indicates the desire level with continuous values from 0 to 100. Server 30 may carry out at least one of selection of a DR vehicle and making of a schedule so as to suppress deterioration of battery 130 more for a user higher in desire level.

FIG. 14 is a diagram for illustrating a modification of selection of a DR vehicle. In this modification, desire information that indicates the desire level with continuous values is adopted. A higher desire level shown in FIG. 14 means a higher first desire level (that is, a level of the user's desire for suppression of deterioration of the power storage) and a lower second desire level (that is, a level of the user's desire for acquisition of the incentive).

Referring to FIG. 14, in requesting a DR vehicle to carry out external power feed, selector 303 sets higher DR participation priority for vehicle 50 higher in desire level. In selection of a DR vehicle to which a request for external power feed is to be issued, vehicle 50 higher in desire level is preferentially sequentially selected in accordance with the DR participation priority. As the SOC of battery 130 is lowered by external power feed, deterioration of battery 130 is suppressed. In requesting a DR vehicle to carry out external charging, selector 303 sets lower DR participation priority for vehicle 50 higher in desire level. In selection of a DR vehicle to which a request for external charging is to be issued, vehicle 50 lower in desire level is preferentially sequentially selected in accordance with the DR participation priority. By lowering a frequency of charging, deterioration of battery 130 is suppressed. Incentive manager 306 sets a higher unit price of the incentive for a user lower in desire level. Thus, in vehicle 50 lower in desire level, the user is more likely to acquire a higher incentive at the sacrifice of susceptibility of battery 130 to deterioration. Consequently, fairness among the users is ensured. Though not shown in FIG. 14, selector 303 may set a smaller upper limit value of the number of times of charging per unit period for vehicle 50 higher in desire level.

In the embodiment, server 30 obtains for each power storage, the desire information that indicates the first desire level (the level of desire for battery life) and the second desire level (the level of desire for acquisition of the incentive), preferentially selects the power storage of the user higher in second desire level (lower in first desire level) for a request for external charging, and preferentially selects the power storage of the user lower in second desire level (higher in first desire level) for a request for external power feed (see FIG. 10). Without being limited as such, server 30 may obtain for each power storage, desire information that indicates only the second desire level and preferentially select the power storage of the user higher in second desire level for each request for external charging and external power feed. It is not essential to change the unit price of the incentive in accordance with the second desire level, and the unit price of the incentive may be constant.

In the embodiment, next departure time estimated by server 30 (more specifically, estimator 302) is used for making a charging schedule. Without being limited as such, server 30 may use next departure time (for example, time of departure of a POV from the house or a drive plan of a MaaS vehicle) obtained from the user for making the charging schedule.

In the embodiment, server 30 remotely controls vehicle 50 to control external charging and external power feed in accordance with a schedule. Remote control of vehicle 50 by server 30, however, is not essential. ECU 150 mounted on vehicle 50 may control external charging and external power feed in accordance with the schedule (a request from request processor 305).

The power management system is not limited to VGI system 1 shown in FIGS. 2 and 3. The power management system may include a power facility that carries out only power feed with electric power supplied from power grid PG or a power facility that carries out only backfeeding to power grid PG. The power management system may include a vehicle capable only of external charging or a vehicle capable only of external power feed. The electric power utility company may be divided for each business sector. A power generation utility and a power transmission and distribution utility may belong to companies different from each other. In the embodiment, for electric power regulation requested in the power market, server 30 selects a DR vehicle, makes a schedule, and issues a request to the DR vehicle (see FIG. 6). Without being limited as such, for electric power regulation requested by an electric power utility company, server 30 may select a DR vehicle, make a schedule, and issue a request for the DR vehicle. The server that selects a DR vehicle, makes a schedule, and issues a request to the DR vehicle is not limited to an aggregator server and any server that manages a vehicle is applicable.

A configuration of the vehicle is not limited to the configuration shown in FIG. 1. For example, in the configuration shown in FIG. 1, a charging apparatus capable only of external charging or a power feed apparatus capable only of external power feed may be adopted instead of charger-discharger 120. The vehicle may be capable of wireless charging. The vehicle is not limited to a passenger vehicle but may be a bus or a truck.

The power management system described above may be applied to a mobile body other than the vehicle. The mobile body may be transportation means (a ship or an airplane) other than the vehicle or an unmanned mobile body (an automated guided vehicle (AGV), an agricultural implement, a movable robot, or a drone). The portable terminal may be carried by a manager of a mobile body (for example, a manager of a drone).

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A power management system comprising:
   a plurality of power storages; and
   a server,
   each of the plurality of power storages carrying out at least one of external charging and external power feed, the external charging being charging of the power storage with electric power supplied from outside, the external power feed being supply of electric power from the power storage to outside,
   the server including
      a selector that selects at least one of the plurality of power storages,
      a scheduler that makes a schedule for the selected power storage, and
      a request processor that requests a user of the selected power storage to control at least one of the external charging and the external power feed in accordance with the made schedule in exchange for an incentive, wherein
   the server
      obtains for each power storage, desire information that indicates at least one of a first desire level and a second desire level, the first desire level indicating a level of user's desire for suppression of deterioration of the power storage, the second desire level indicating a level of user's desire for acquisition of the incentive for meeting a request, the incentive being a unit price, and carries out at least one of selection of the power storage and making of the schedule based on the obtained desire information, and wherein when the selector selects vehicles including a first vehicle that places a priority on a battery life and a second vehicle that places a priority on the incentive, the scheduler sets a charging schedule for the second vehicle to precede a charging schedule for the first vehicle, wherein when the selector selects a power storage of which a user is requested to carry out external power feed by the request processor, the selector preferentially sequentially selects the power storage higher in the first desire level or the power storage lower in the second desire level from among power storages that satisfy a prescribed condition, the prescribed condition including at least one of a state of charge of the power storage being equal to or larger than a prescribed value or a temperature of the power storage being equal to or larger than a second prescribed value, the server manages for each user, the unit price of the incentive given to the user that meets the request from the request processor, and increases the unit price of the incentive for the user lower in the first desire level or the user higher in the second desire level, the plurality of power storages are mounted on a plurality of vehicles, respectively, the power management system further comprises:
 a plurality of power facilities electrically connectable to the plurality of vehicles; and
 a power grid that supplies electric power to each of the plurality of power facilities, and the request processor transmits a signal to at least one of communication equipment mounted on a vehicle and a portable terminal carried by a user of the vehicle, the signal requesting the user of the vehicle to control at least one of the external charging and the external power feed in accordance with the schedule.

2. The power management system according to claim 1, wherein
 the desire information is at least one of
  information that indicates the level of the user's desire for suppression of deterioration of the power storage by any of desiring and not desiring suppression of deterioration of the power storage, and
  information that indicates the level of the user's desire for acquisition of the incentive by any of desiring and not desiring acquisition of the incentive.

3. The power management system according to claim 1, wherein
 when the selector selects a power storage of which a user is requested to carry out external charging by the request processor, the selector preferentially sequentially selects the power storage lower in the first desire level or the power storage higher in the second desire level.

4. The power management system according to claim 1, wherein
 the server obtains next departure time for each vehicle of the plurality of vehicle,
 each of the plurality of vehicles moves with electric power stored in the power storage, and
 when the scheduler makes a charging schedule for a vehicle including the selected power storage, the scheduler makes the charging schedule to make a time lag between charging end time and the next departure time smaller in a vehicle of a user higher in the first desire level or a user lower in the second desire level.

5. The power management system according to claim 1, wherein
 the selector sets an upper limit value of the number of times of charging per unit period for each power storage based on the desire information, and excludes a power storage of which the number of times of charging per unit period has exceeded the upper limit value from candidates for selection.

6. The power management system according to claim 1, further comprising a plurality of portable terminals carried by respective users of the plurality of power storages, wherein
 each of the plurality of portable terminals accepts input from the user of the power storage, and
 when the desire information is input by the user of the power storage, each of the plurality of portable terminals transmits the input desire information to the server.

7. The power management system according to claim 1, wherein
 the power management system further comprises a plurality of user terminals mounted on the plurality of vehicles, respectively, and
 each of the plurality of user terminals accepts input from the user of the power storage, and when the user of the power storage inputs the desire information, each of the plurality of user terminals transmits the input desire information to the server.

* * * * *